US009505496B2

(12) United States Patent
Markov

(10) Patent No.: US 9,505,496 B2
(45) Date of Patent: Nov. 29, 2016

(54) AERIAL INSECT RELEASE APPARATUS

(71) Applicant: Michael Beaugavin Markov, Oceanside, CA (US)

(72) Inventor: Michael Beaugavin Markov, Oceanside, CA (US)

( * ) Notice: Subject to any disclaimer, the term of this patent is extended or adjusted under 35 U.S.C. 154(b) by 99 days.

(21) Appl. No.: 14/517,870

(22) Filed: Oct. 19, 2014

(65) Prior Publication Data
US 2015/0041593 A1 Feb. 12, 2015

Related U.S. Application Data

(63) Continuation-in-part of application No. 13/784,469, filed on Mar. 4, 2013.

(51) Int. Cl.
| | | |
|---|---|---|
| *B64D 1/02* | (2006.01) | |
| *B64D 1/08* | (2006.01) | |
| *B64D 1/12* | (2006.01) | |
| *A01K 1/08* | (2006.01) | |
| *B64C 39/02* | (2006.01) | |

(52) U.S. Cl.
CPC . *B64D 1/12* (2013.01); *A01K 1/08* (2013.01); *B64C 39/024* (2013.01); *B64D 1/02* (2013.01); *B64D 1/08* (2013.01); *B64C 2201/128* (2013.01)

(58) Field of Classification Search
CPC ............ B64D 1/00; B64D 1/02; B64D 1/04; B64D 1/08; B64D 1/12; B64D 25/12; B64C 2201/12; B64C 2201/121; B64C 2201/128
See application file for complete search history.

(56) References Cited

U.S. PATENT DOCUMENTS

| 2,583,884 A | 1/1952 | Walter |
| 3,532,276 A | 10/1970 | Dunn |
| 3,860,202 A | 1/1975 | Johnson |
| 3,962,821 A | 6/1976 | Sharp |
| 4,208,949 A * | 6/1980 | Boilsen .................... B64D 1/04 244/137.4 |
| 4,260,108 A | 4/1981 | Maedgen, Jr. |
| 4,290,500 A | 9/1981 | Hopkins et al. |
| 4,333,384 A * | 6/1982 | Arnold ..................... B64D 1/06 244/137.4 |
| 4,337,541 A | 7/1982 | Brown |
| 4,382,568 A | 5/1983 | Schertz |
| 4,608,907 A * | 9/1986 | Ellis ......................... B64D 1/04 244/137.4 |
| 5,078,090 A | 1/1992 | Richman |
| 5,148,989 A | 9/1992 | Skinner |
| 5,279,481 A | 1/1994 | Trotter |
| 5,794,847 A | 8/1998 | Stocker |
| 6,003,782 A | 12/1999 | Kim |
| 6,056,237 A * | 5/2000 | Woodland ................. B64C 3/40 244/120 |
| 6,243,649 B1 | 6/2001 | Wetherbee et al. |

(Continued)

OTHER PUBLICATIONS

Measurement and Control, K. Kadlec, p. 5 and 6 2008.

(Continued)

*Primary Examiner* — Ryan Reis
(74) *Attorney, Agent, or Firm* — Thomas J. Lavan

(57) ABSTRACT

An apparatus to aerially dispense payload containers from an aircraft is provided. The apparatus includes an outer portion, including an opening to allow a payload container to leave the apparatus when the payload container is in alignment with the opening. The apparatus also includes an inner portion, configured to rotate within the outer portion. The inner portion has one or more cutouts that retain the payload container. The apparatus further includes an actuator, coupled to the inner portion, and a processor circuit. The processor circuit commands the actuator to rotate the inner portion to cause the payload container to align with the opening.

20 Claims, 23 Drawing Sheets

(56) References Cited

U.S. PATENT DOCUMENTS

| | | |
|---|---|---|
| 6,318,023 B1 | 11/2001 | Yamashita |
| 6,328,638 B1 | 12/2001 | Hopkins |
| 6,619,226 B2 | 9/2003 | Rooke |
| 7,040,579 B2 | 5/2006 | Howe |
| 7,398,740 B2 | 7/2008 | Boncodin |
| 7,467,716 B2 | 12/2008 | Kraus |
| 7,717,356 B2 | 5/2010 | Petersen |
| 2003/0192992 A1* | 10/2003 | Olsen .................. B64C 1/22 244/137.1 |
| 2005/0072880 A1 | 4/2005 | Nolan |
| 2005/0204910 A1* | 9/2005 | Padan .................. B64D 1/04 89/1.813 |
| 2006/0102792 A1* | 5/2006 | Pitzer .................. B64D 1/02 244/137.1 |
| 2009/0132100 A1 | 5/2009 | Shibata |
| 2010/0006667 A1 | 1/2010 | Nielsen et al. |
| 2011/0264307 A1 | 10/2011 | Guyette et al. |
| 2012/0199064 A1 | 8/2012 | Foy |
| 2012/0248248 A1 | 10/2012 | Thompson |
| 2012/0297671 A1 | 11/2012 | Sexton et al. |
| 2015/0041596 A1 | 2/2015 | Markov |
| 2015/0122950 A1 | 5/2015 | Markov |

OTHER PUBLICATIONS

Huang et al., "Development of a spray system for an unmanned aerial vehicle platform", 2009.
Official Action for U.S. Appl. No. 14/517,866 mailed Mar. 10, 2016.
Official Action for U.S. Appl. No. 14/517,866 mailed Apr. 21, 2016.
Official Action for U.S. Appl. No. 14/596,997 mailed Mar. 10, 2016.
Notice of Allowance for U.S. Appl. No. 14/596,997 mailed Apr. 15, 2016.
Official Action for U.S. Appl. No. 14/597,018 mailed Mar. 1, 2016.
Notice of Allowance for U.S. Appl. No. 14/597,018 mailed Apr. 5, 2016.
Official Action for U.S. Appl. No. 13/784,469 mailed Feb. 18, 2016.
Official Action for U.S. Appl. No. 13/784,469 mailed Feb. 13, 2015.
Official Action for U.S. Appl. No. 13/784,469 mailed Nov. 10, 2015.
Official Action for U.S. Appl. No. 14/597,018 mailed Dec. 16, 2015.
Official Action for U.S. Appl. No. 13/784,469 mailed Jun. 21, 2016.
Official Action for U.S. Appl. No. 13/784,469 mailed Sep. 2, 2016.
Notice of Allowance for U.S. Appl. No. 14/517,866 mailed Jul. 7, 2016.
Notice of Allowance for U.S. Appl. No. 14/517,866 mailed Jul. 29, 2016.

* cited by examiner

*Fig. 1a Beneficial insect distribution system using airplane*

- 104 airplane
- 108 spray boom
- 112 distribution apparatus (1 of 2)
- 124 payload container
- 116 target area
- 120 flowers

*Fig. 1b Airplane side view*

- 104 airplane
- 108 spray boom
- 112 distribution apparatus (1 of 2)

Fig. 2a  Beneficial insect distribution system using helicopter
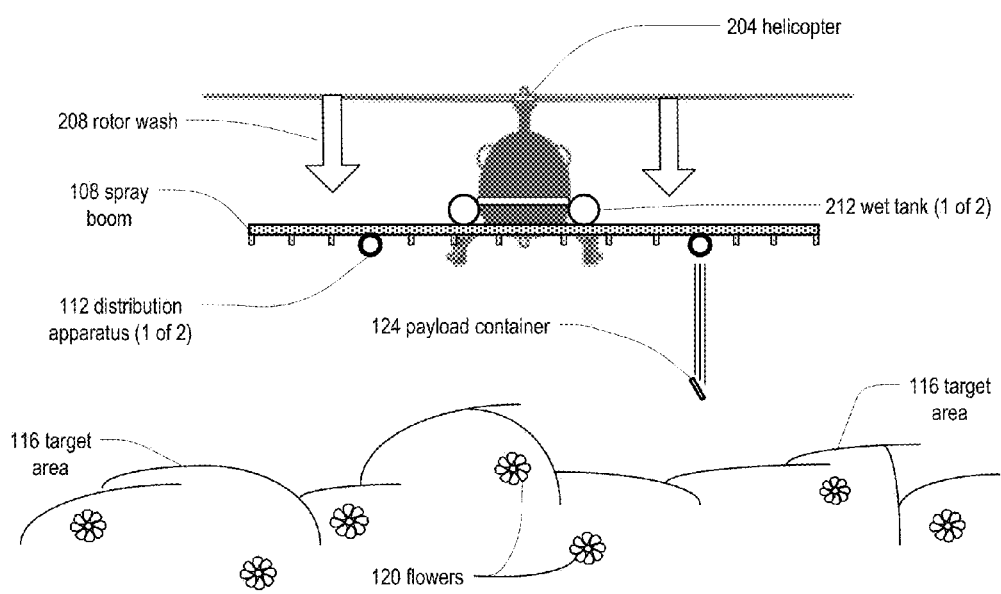
Fig. 2b  Helicopter side view
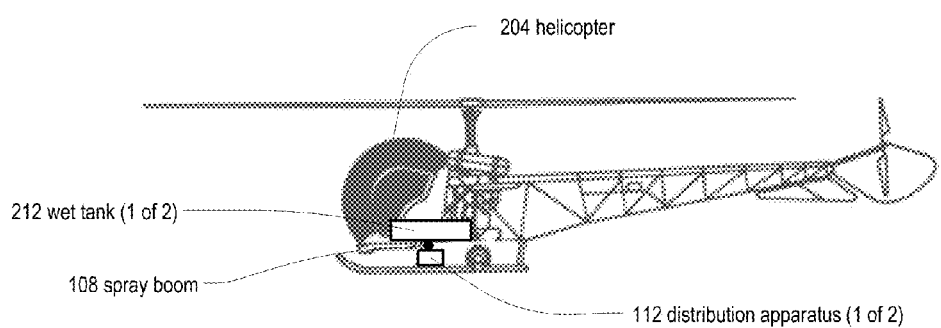

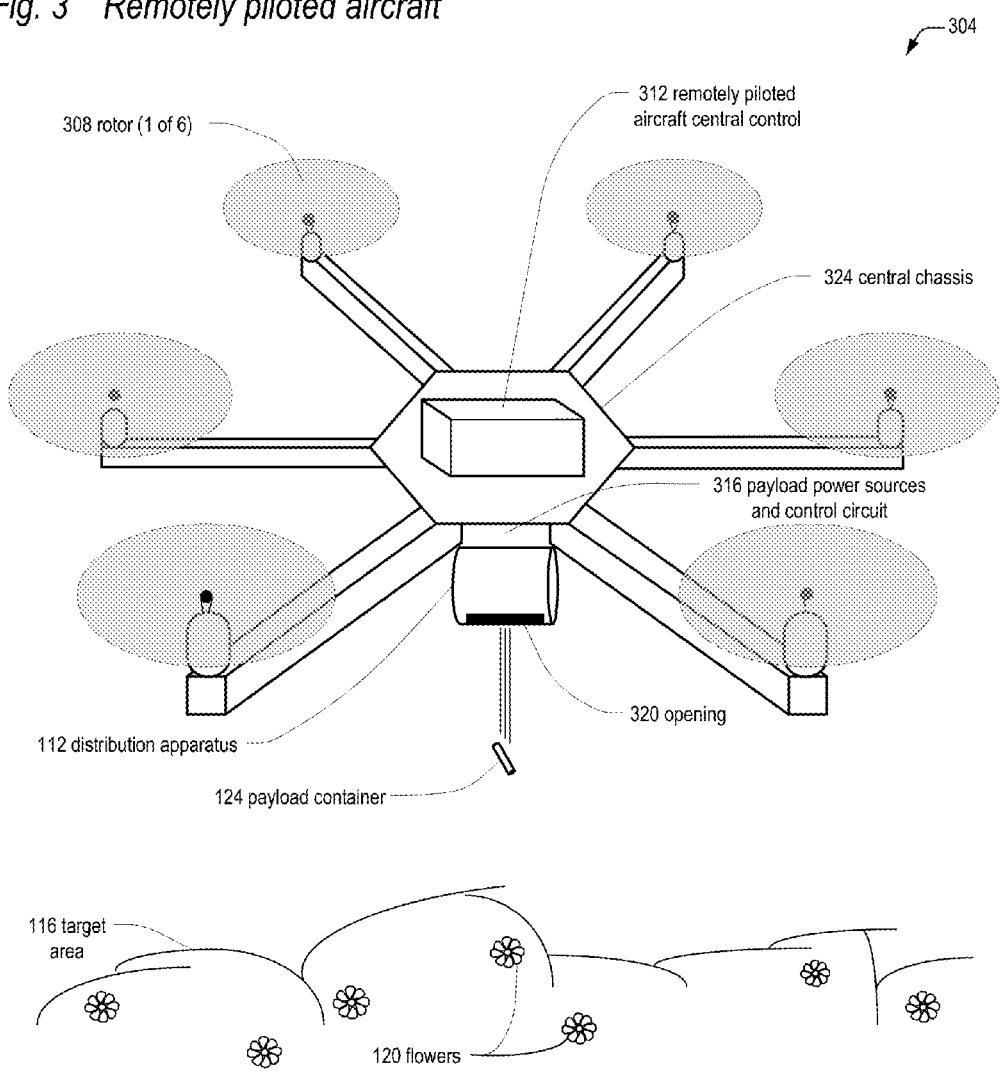
Fig. 3   Remotely piloted aircraft

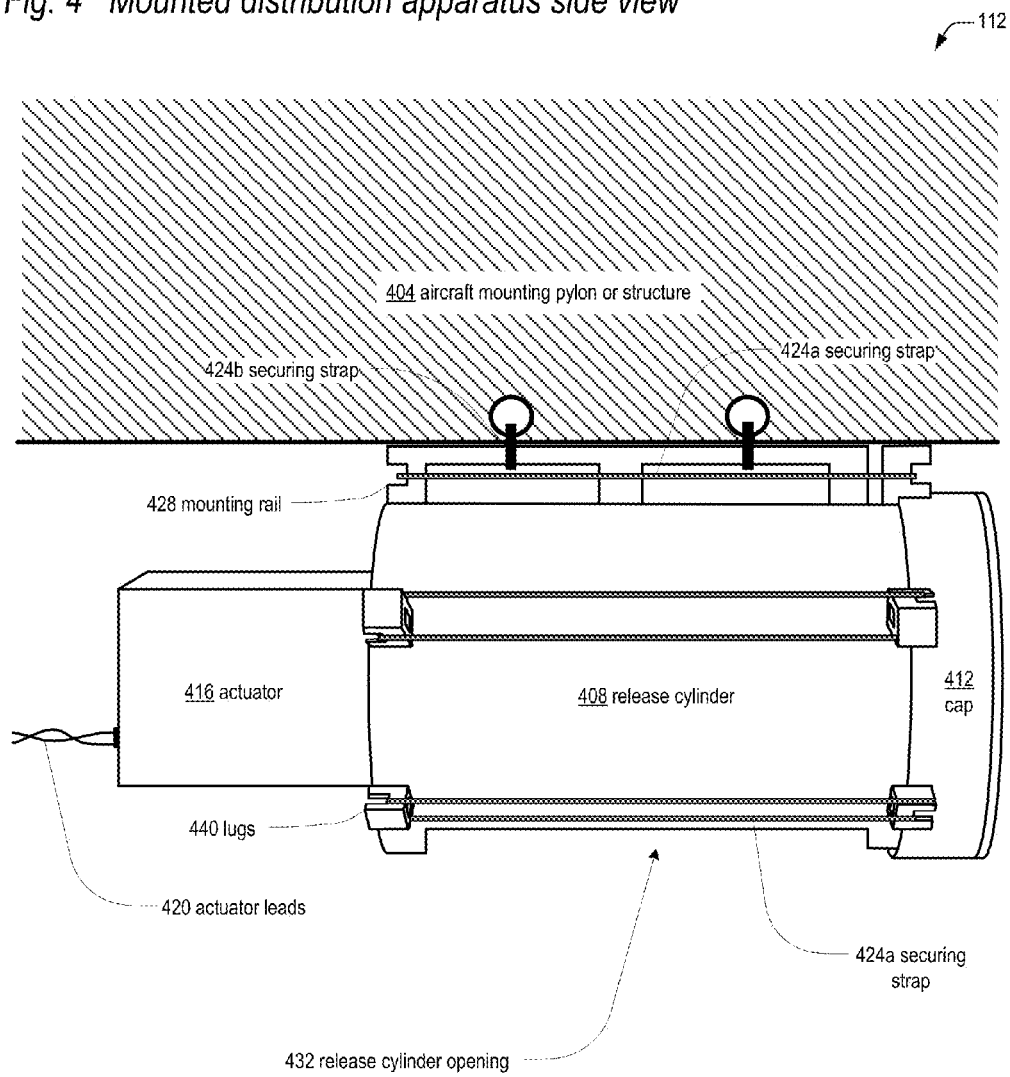

Fig. 5   Unmounted distribution apparatus in payload container loading position
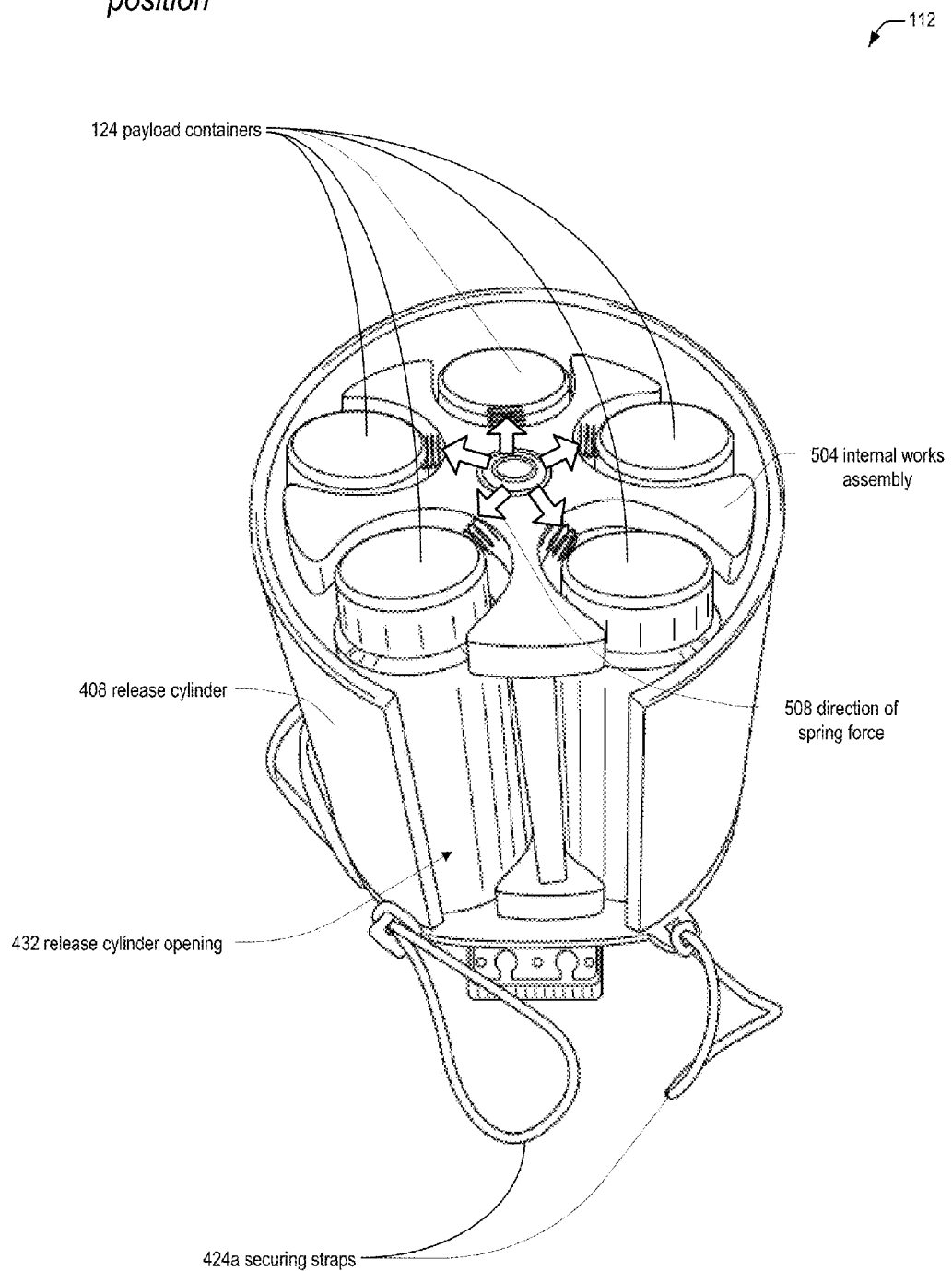

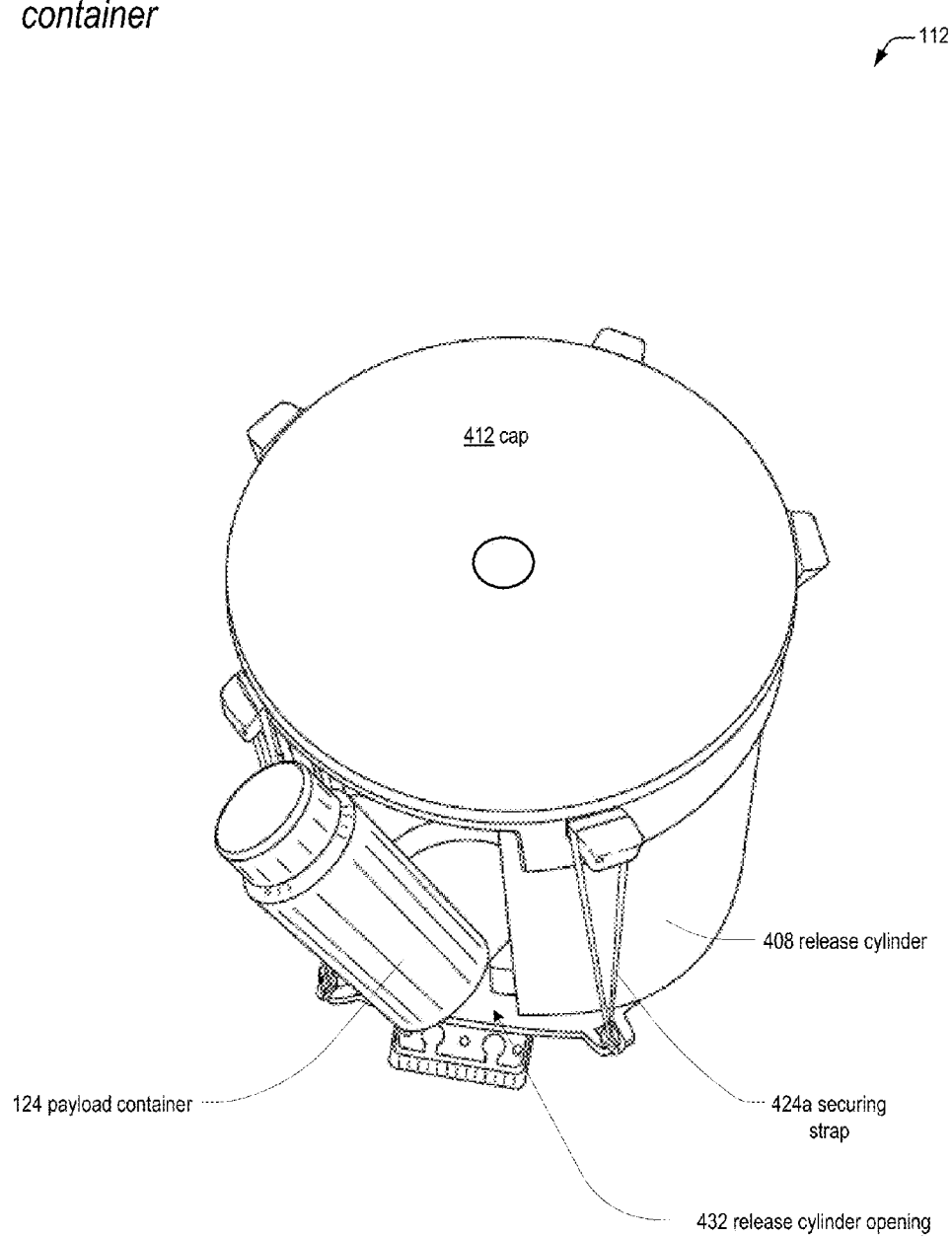
Fig. 6  Mounted distribution apparatus while dropping a payload container

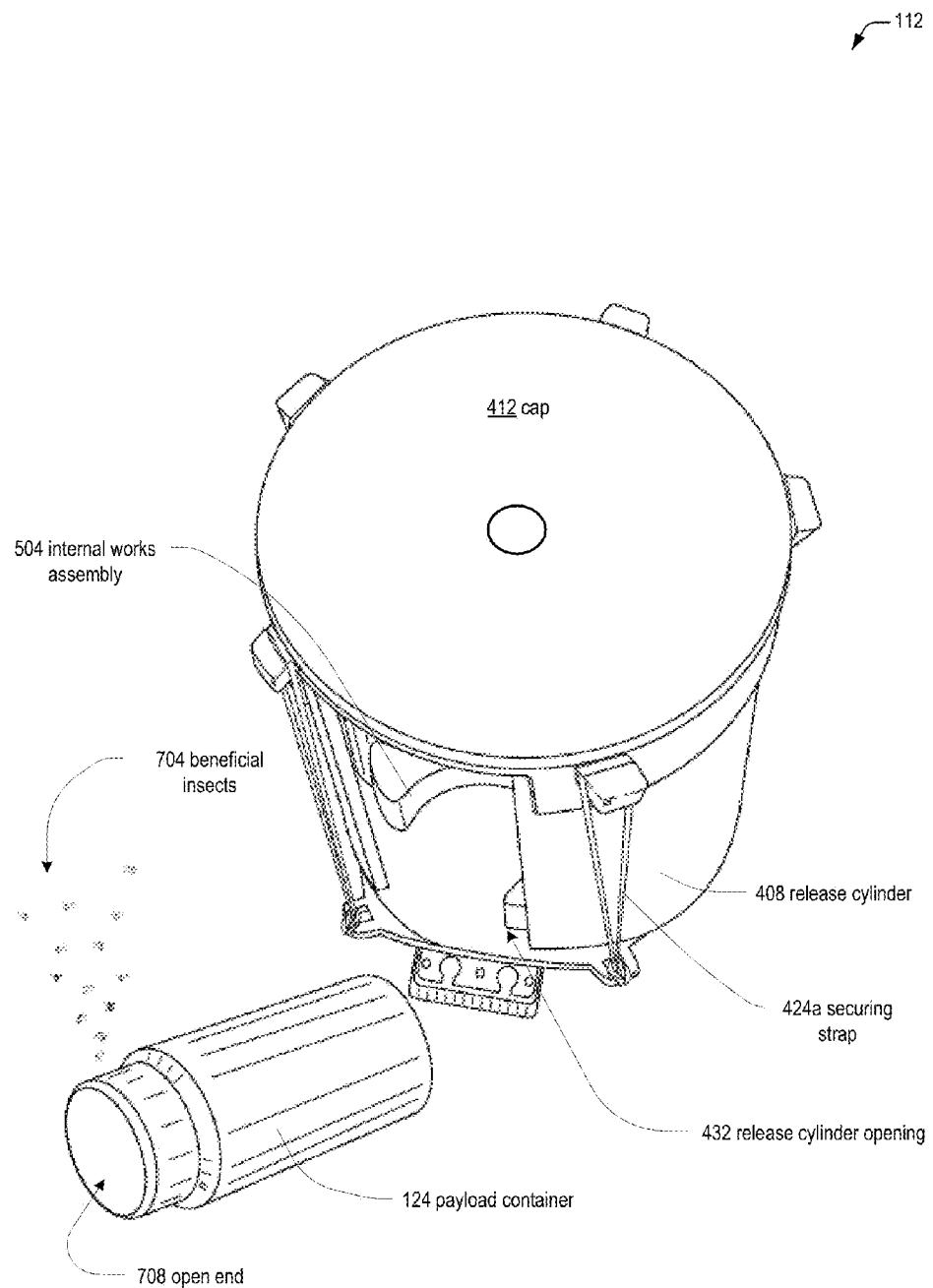
Fig. 7 Mounted distribution apparatus and dropped payload container

*Fig. 8a  Side view of release cylinder*
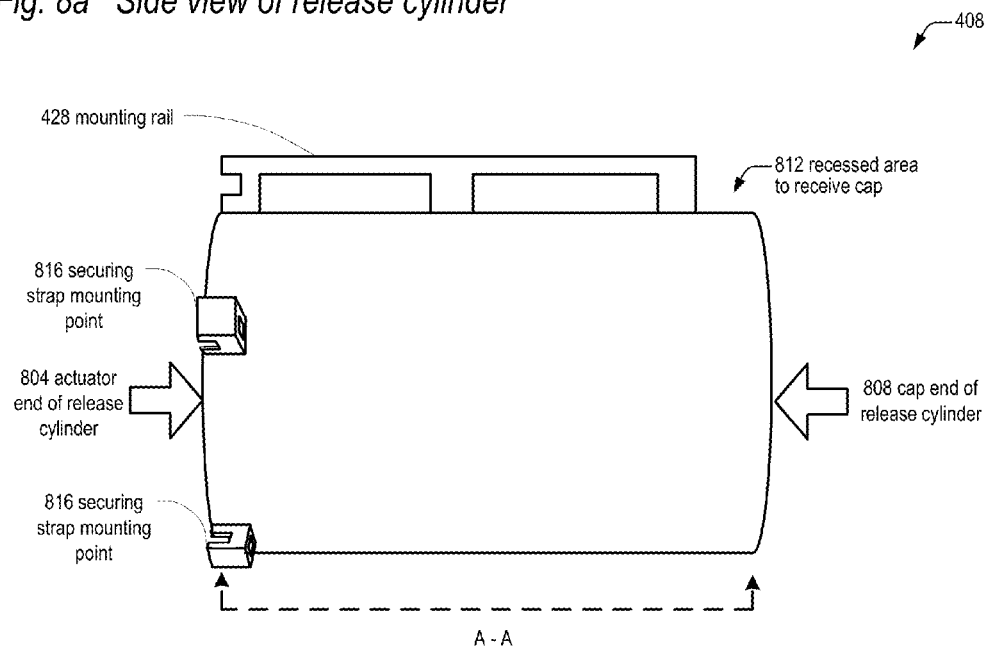
*Fig. 8b  Bottom of release cylinder, view A - A*
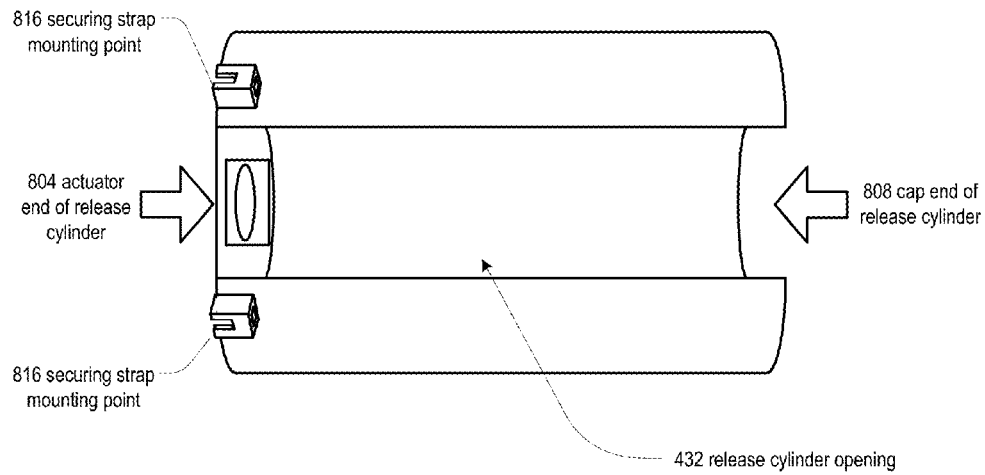

*Fig. 8c   Cap end view of release cylinder*
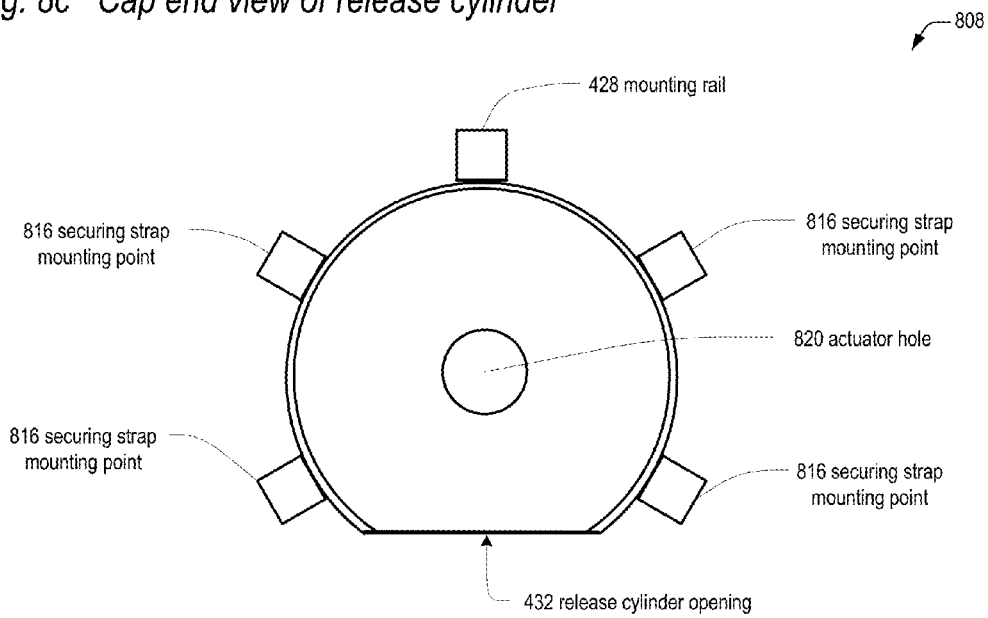
*Fig. 8d   Actuator end view of release cylinder*
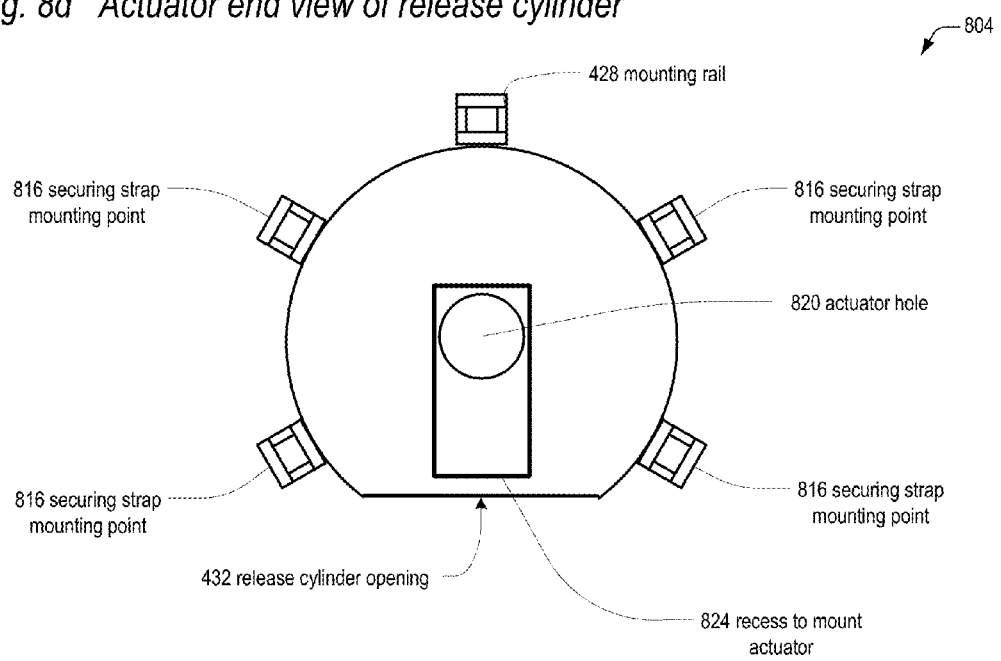

*Fig. 9a  End view of cylinder cap*
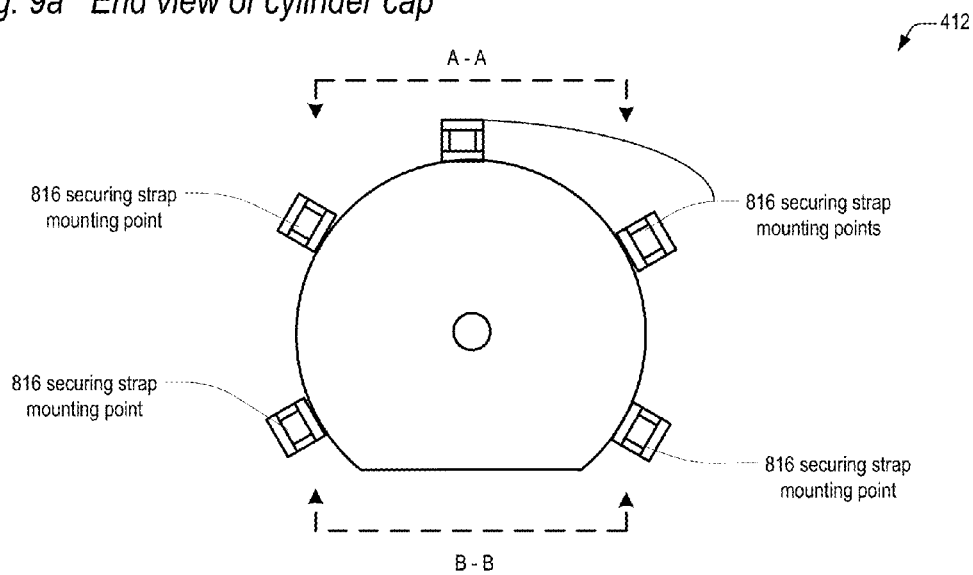
*Fig. 9b  Top view of cylinder cap, view A-A*
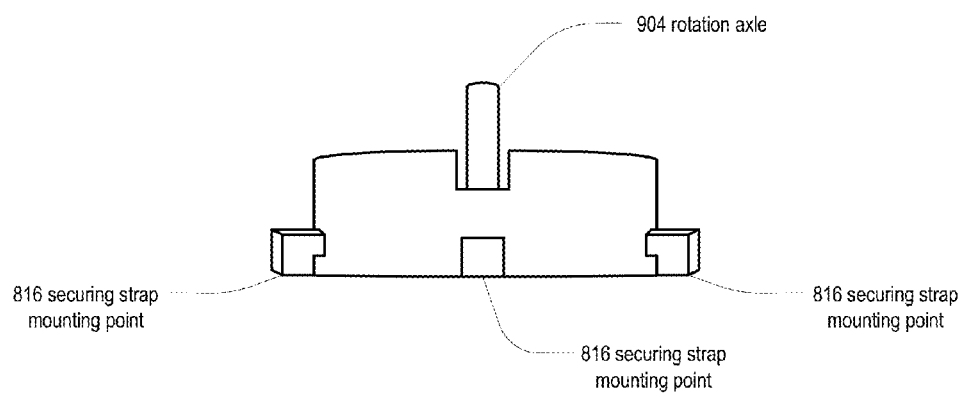

Fig. 9c  Bottom view of cylinder cap, view B-B
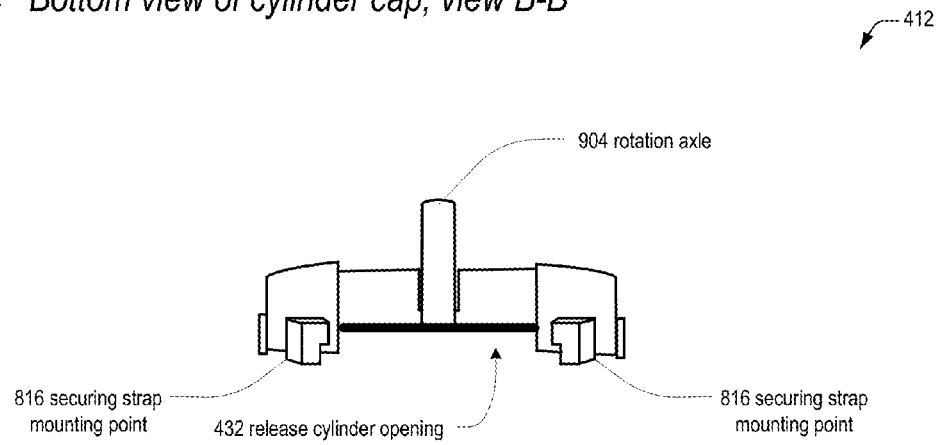
Fig. 9d  Internal view of cylinder cap
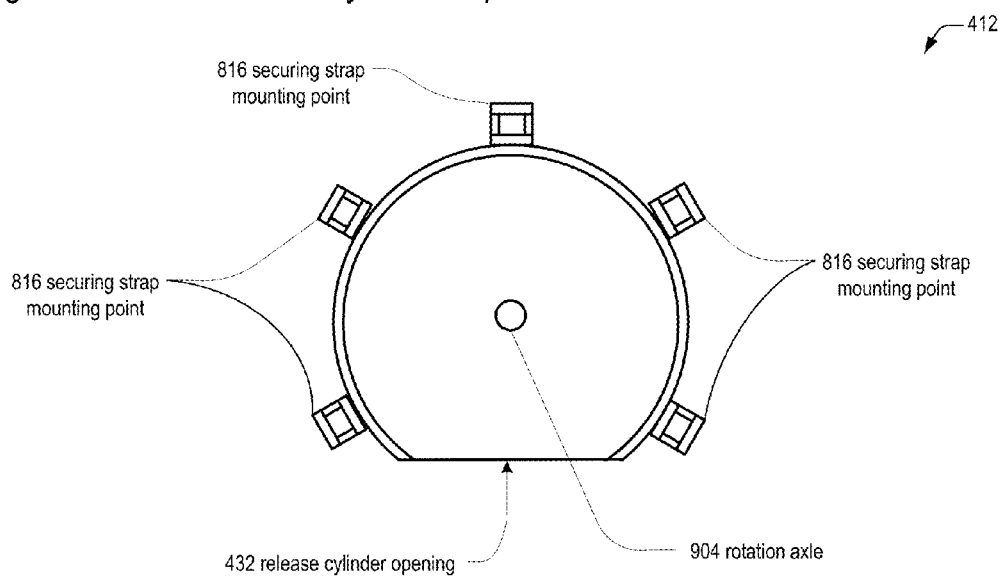

*Fig. 10a Internal works assembly first embodiment*
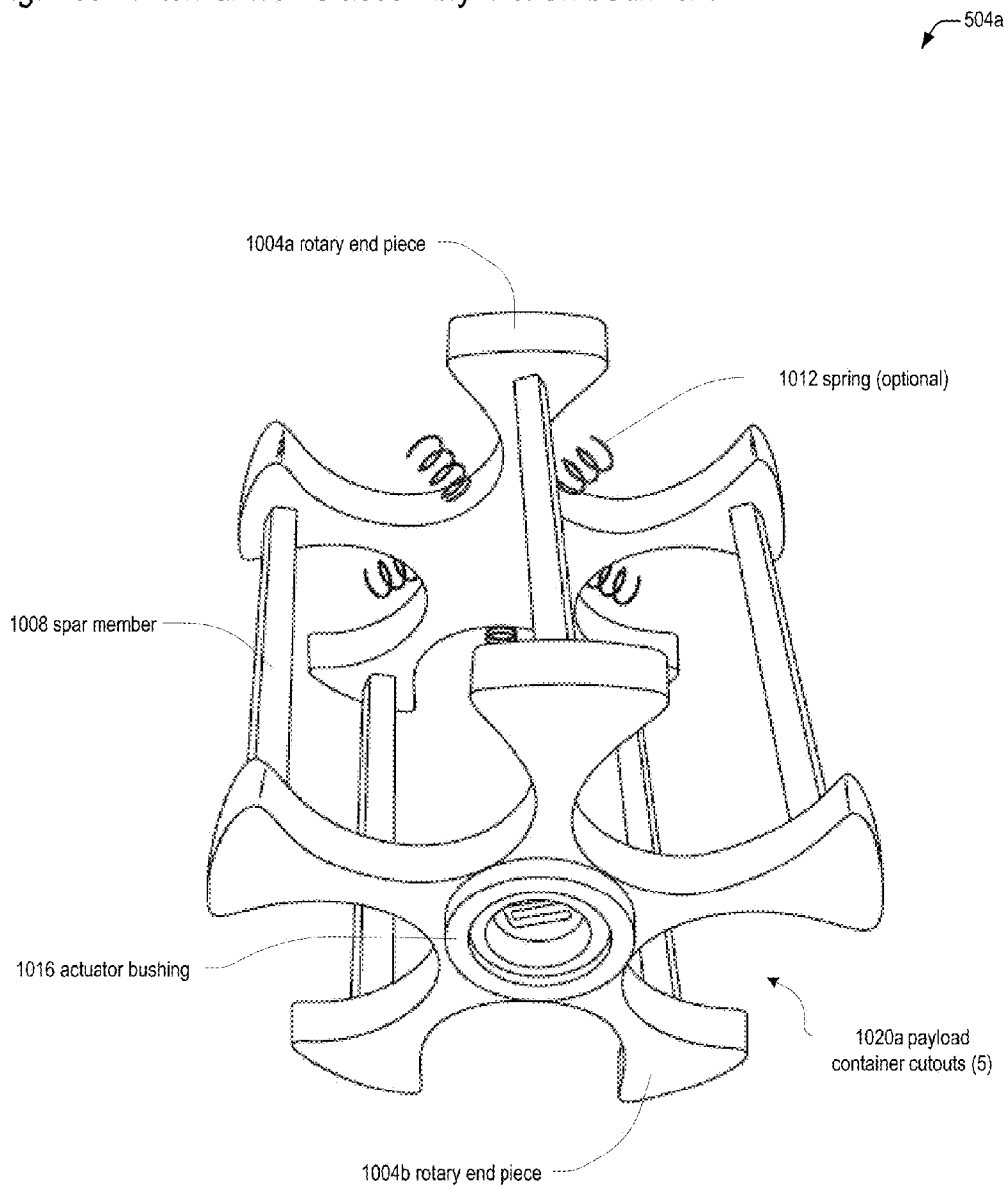

Fig. 10b  Internal works assembly second embodiment
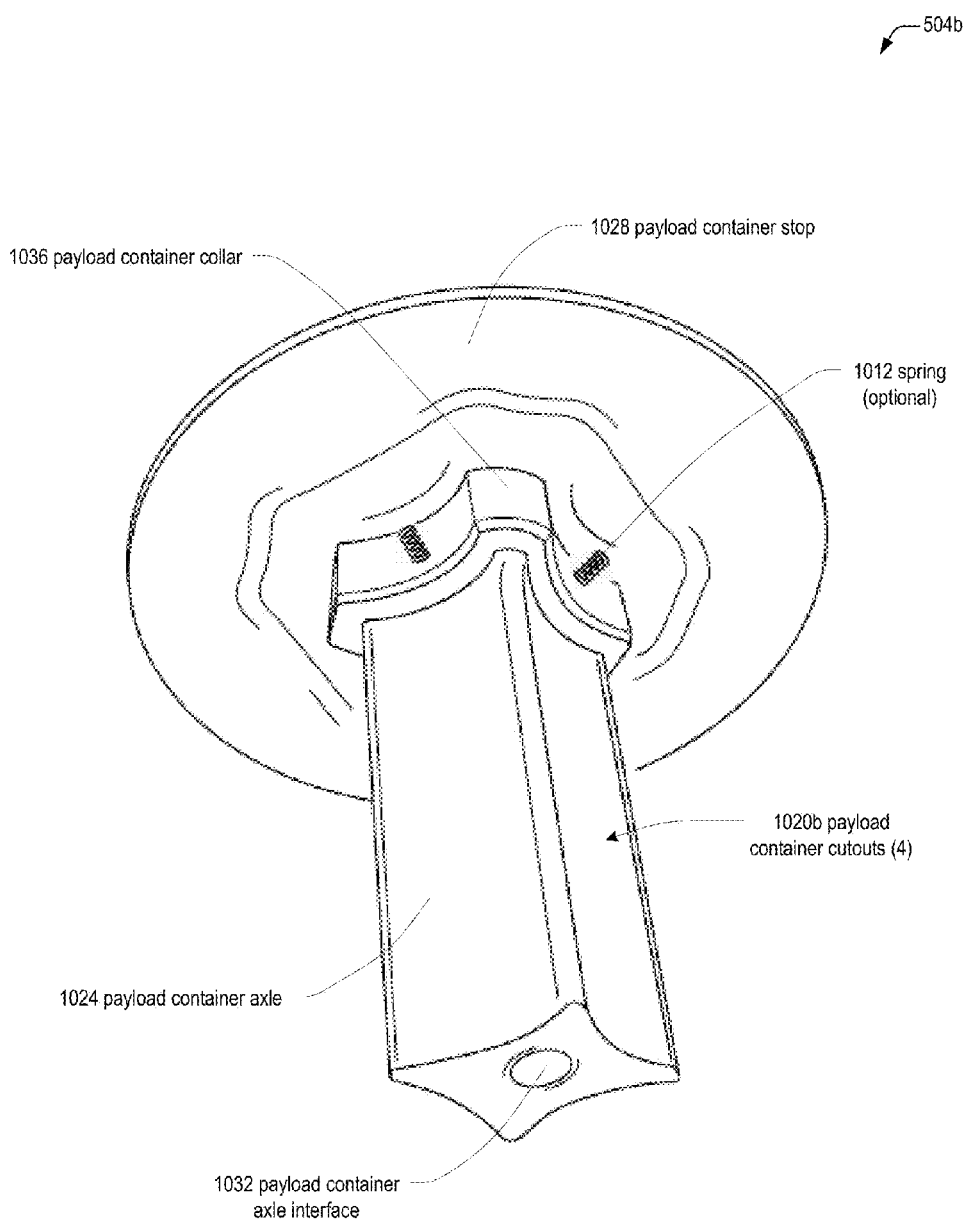

Fig. 11a  Rotary end piece actuator end outside view
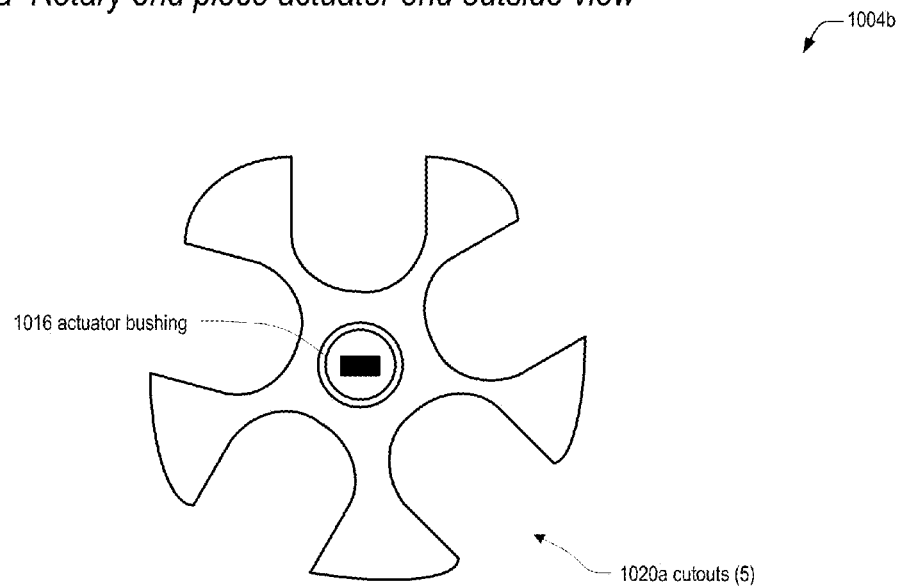
Fig. 11b  Rotary end piece actuator end inside view
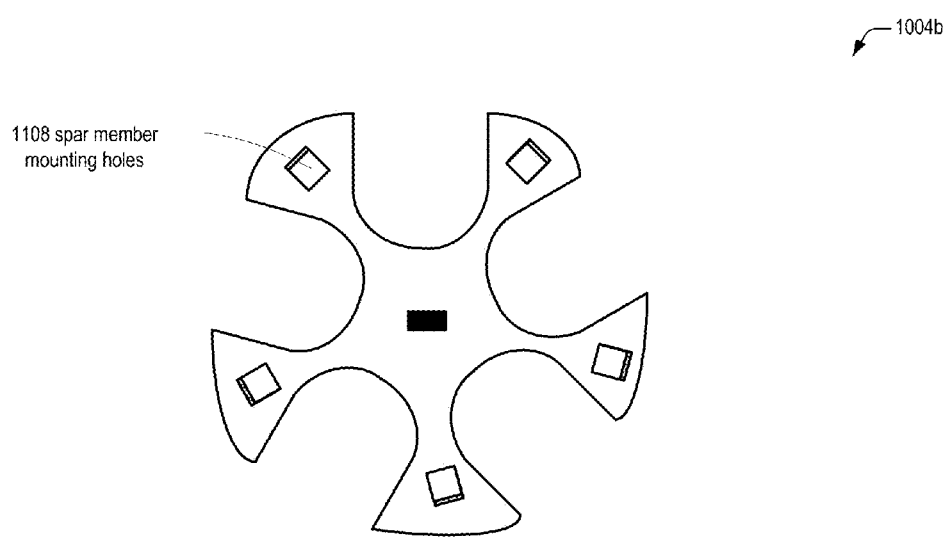

Fig. 11c  Rotary end piece cap end outside view
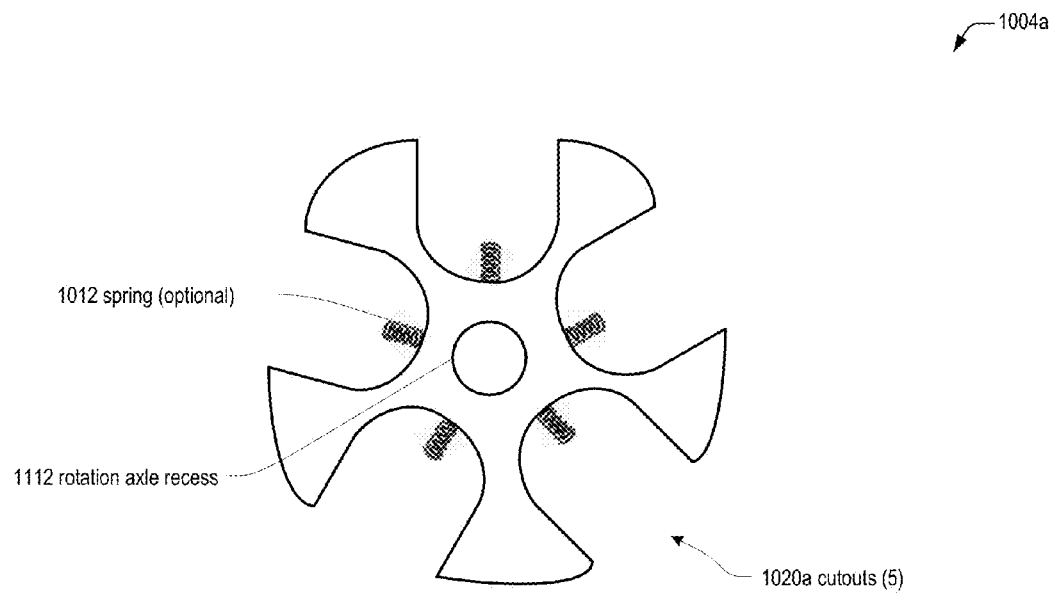
Fig. 11d  Rotary end piece cap end inside view
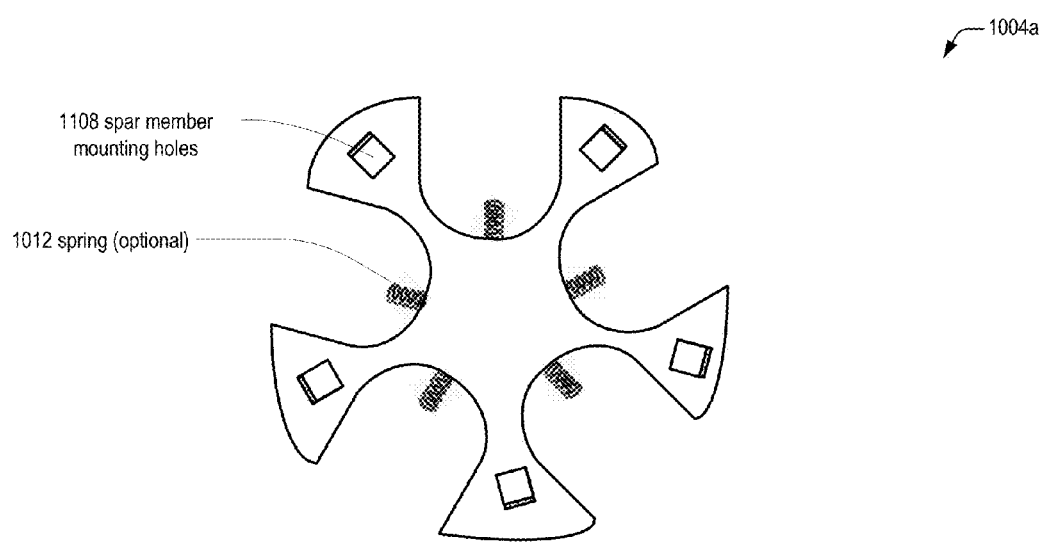

Fig. 11e Spar members
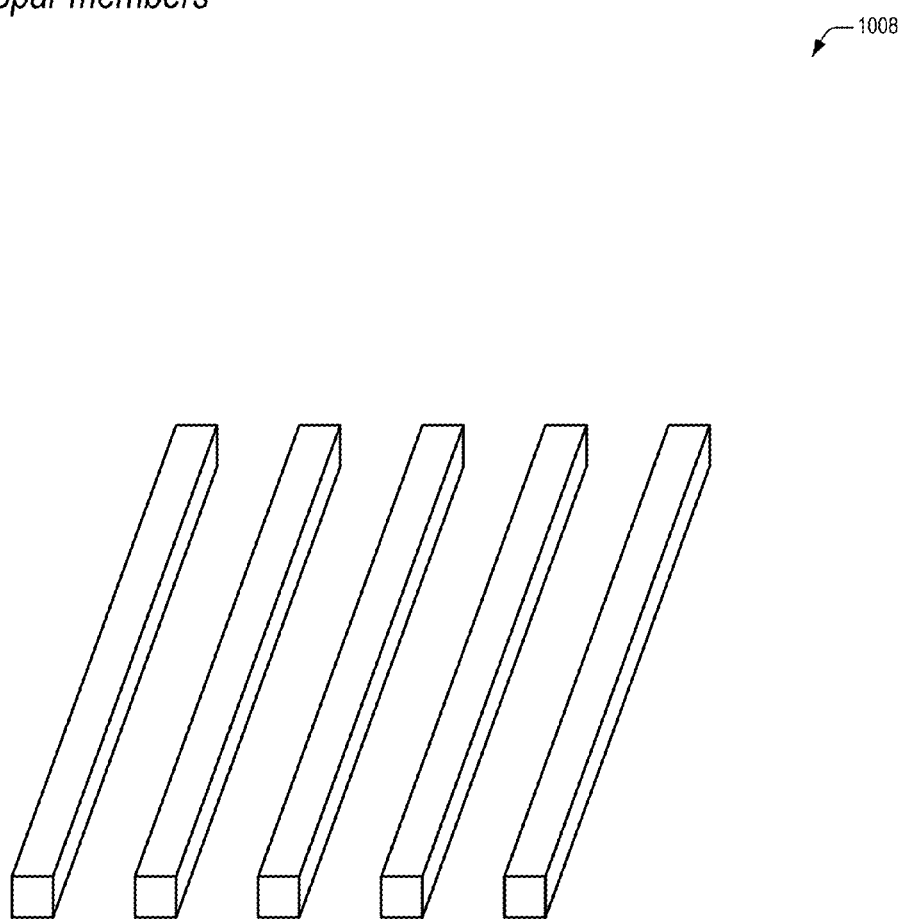

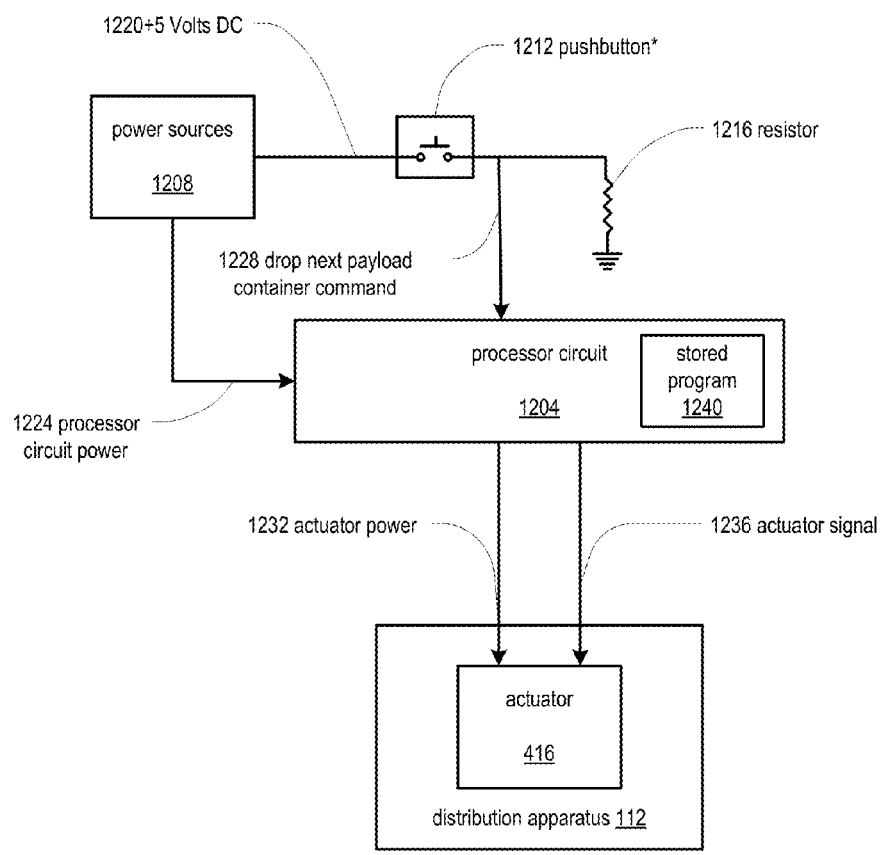
Fig. 12 Wired beneficial insect distribution system circuit block diagram Fig. 13 Wireless beneficial insect distribution system circuit block diagram
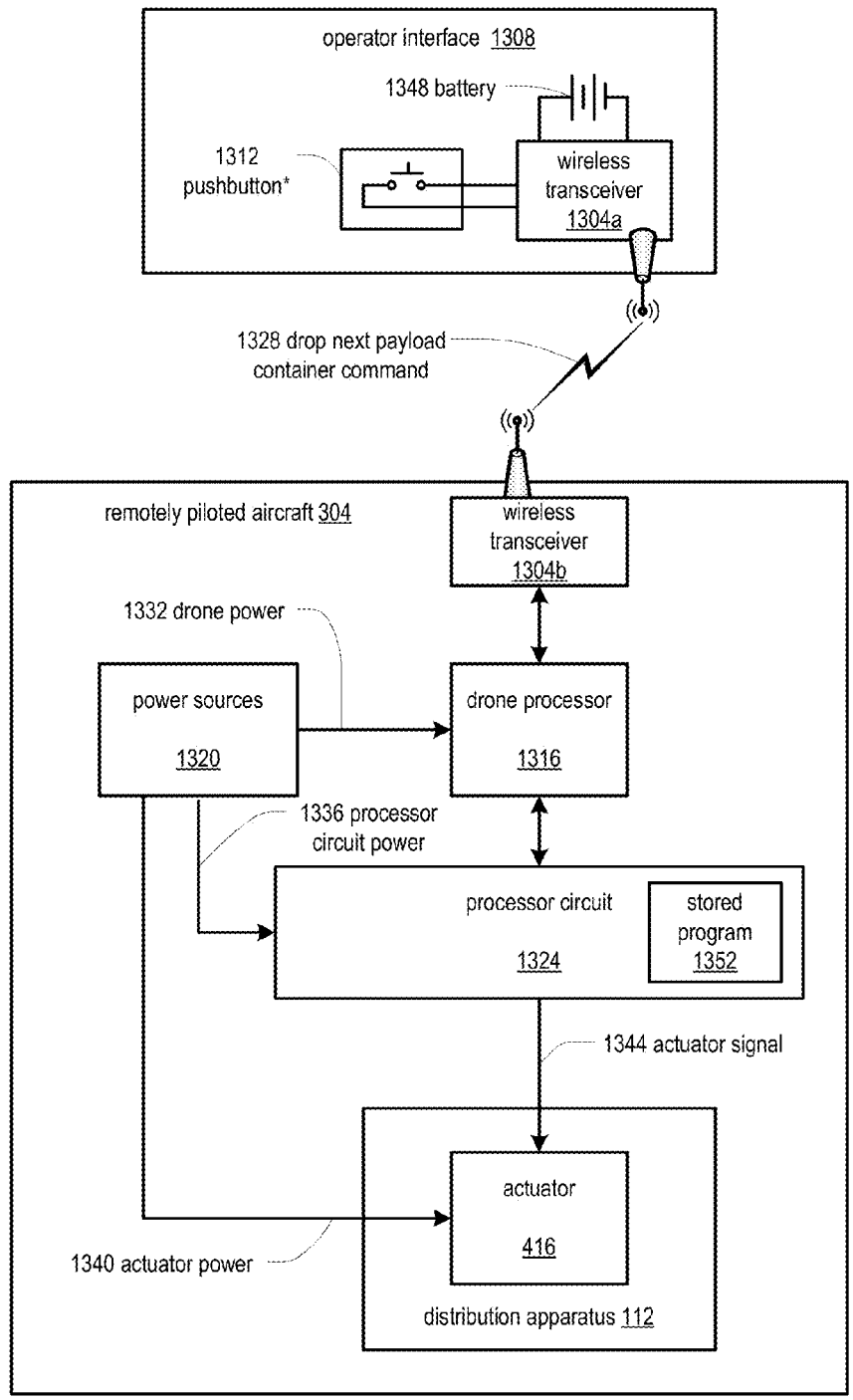

Fig. 14a  First embodiment of payload container loading process
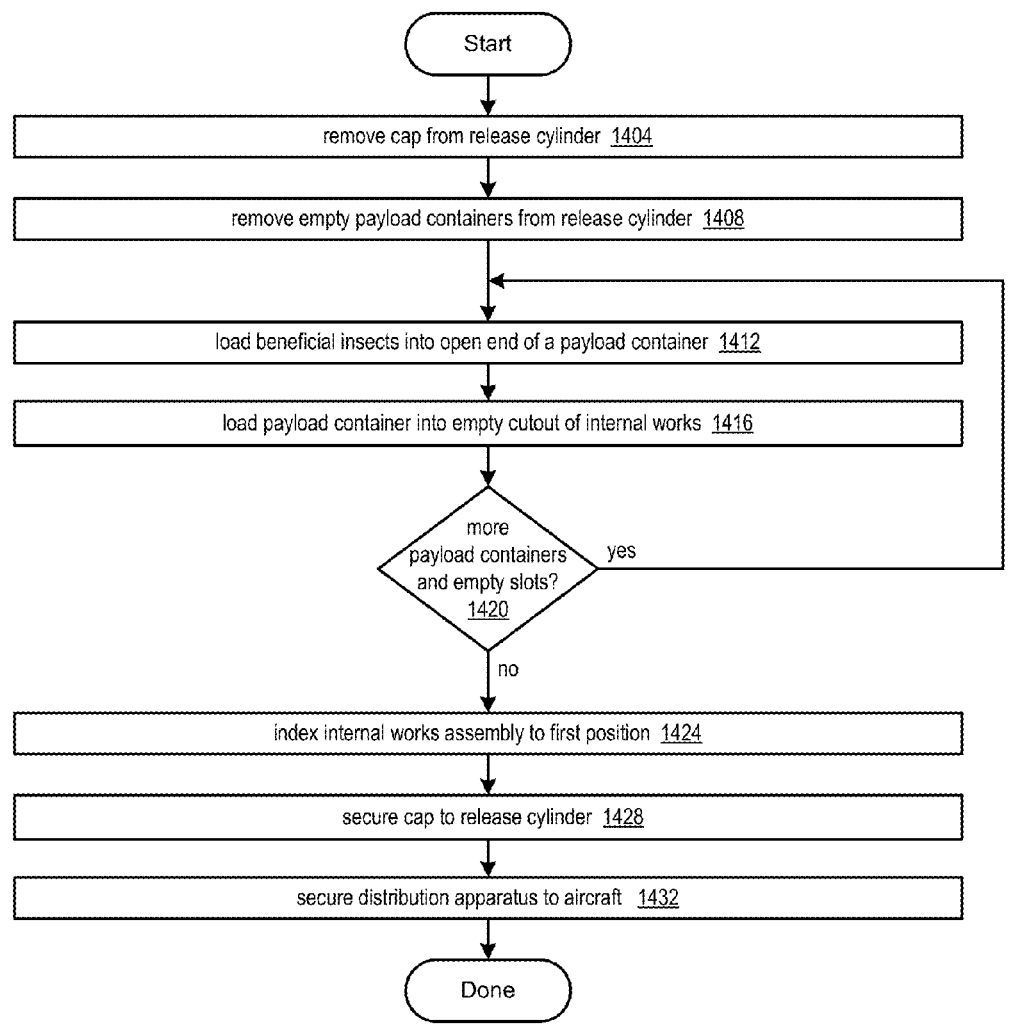

*Fig. 14b  Second embodiment of payload container loading process*
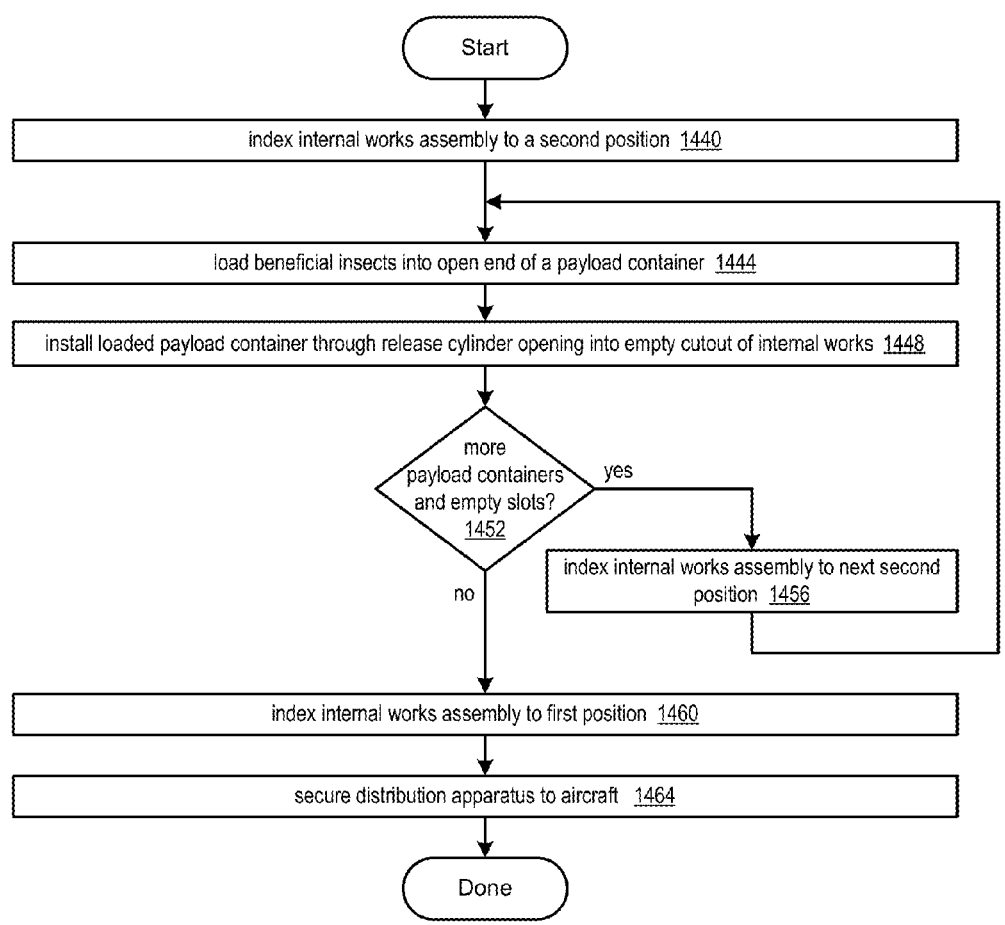

*Fig. 15 Manned aircraft payload container distribution process*
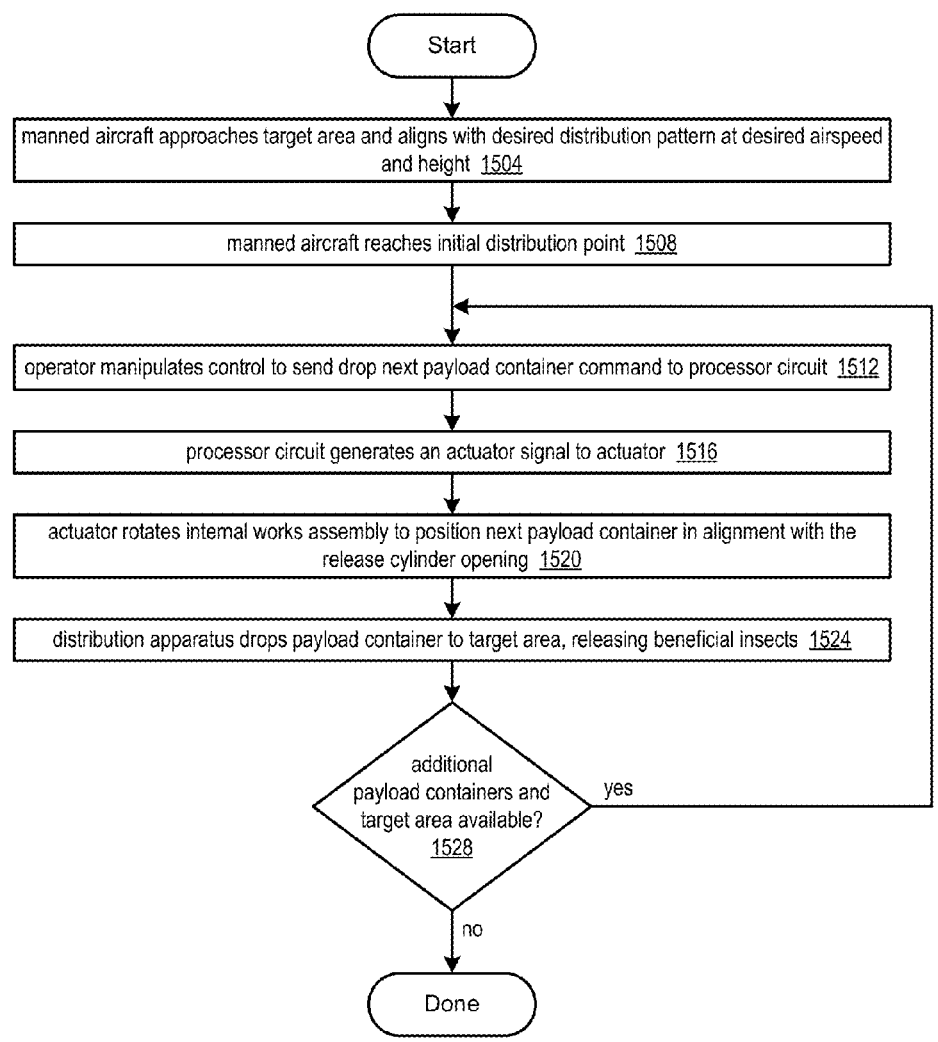

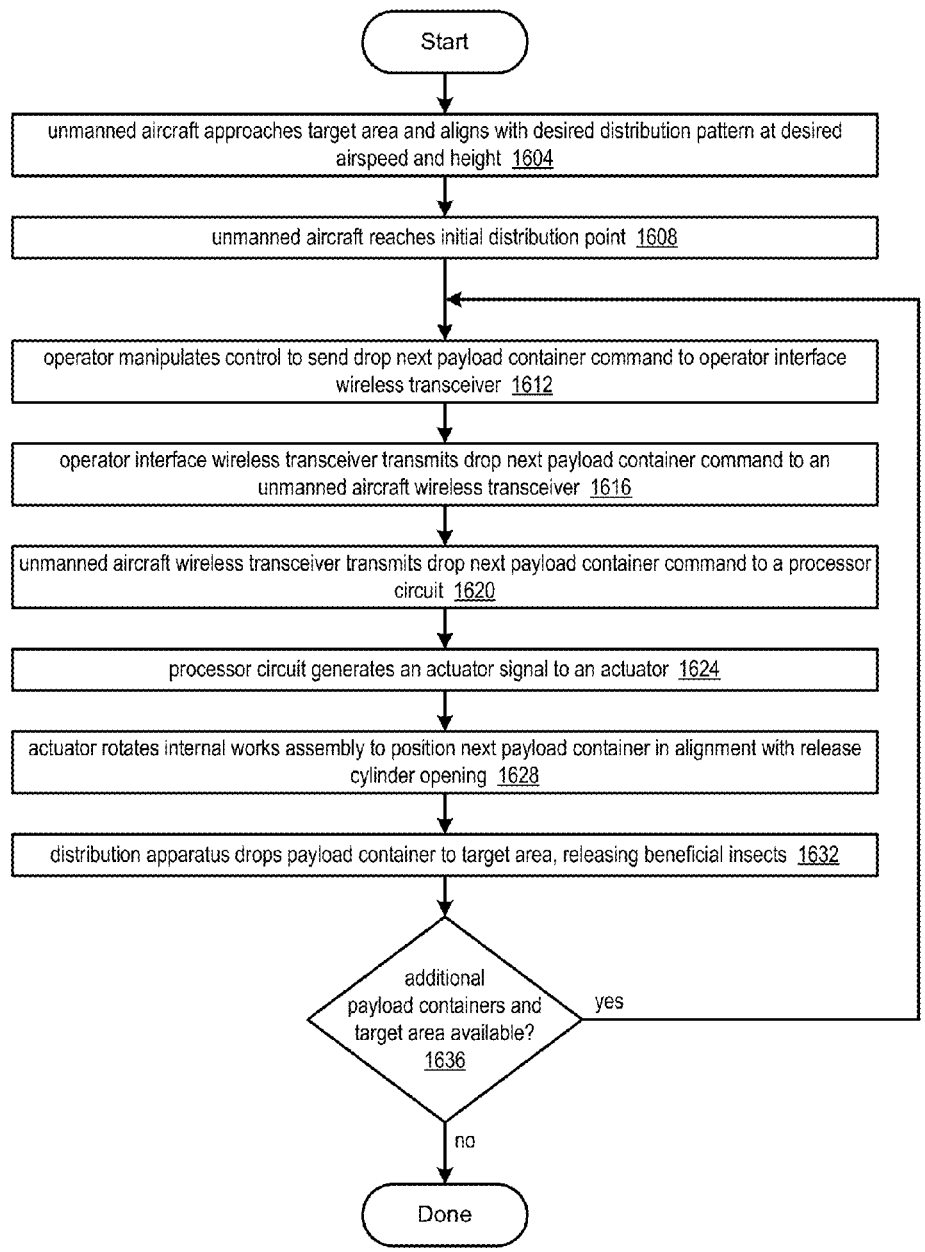
Fig. 16 Unmanned aircraft payload container distribution process

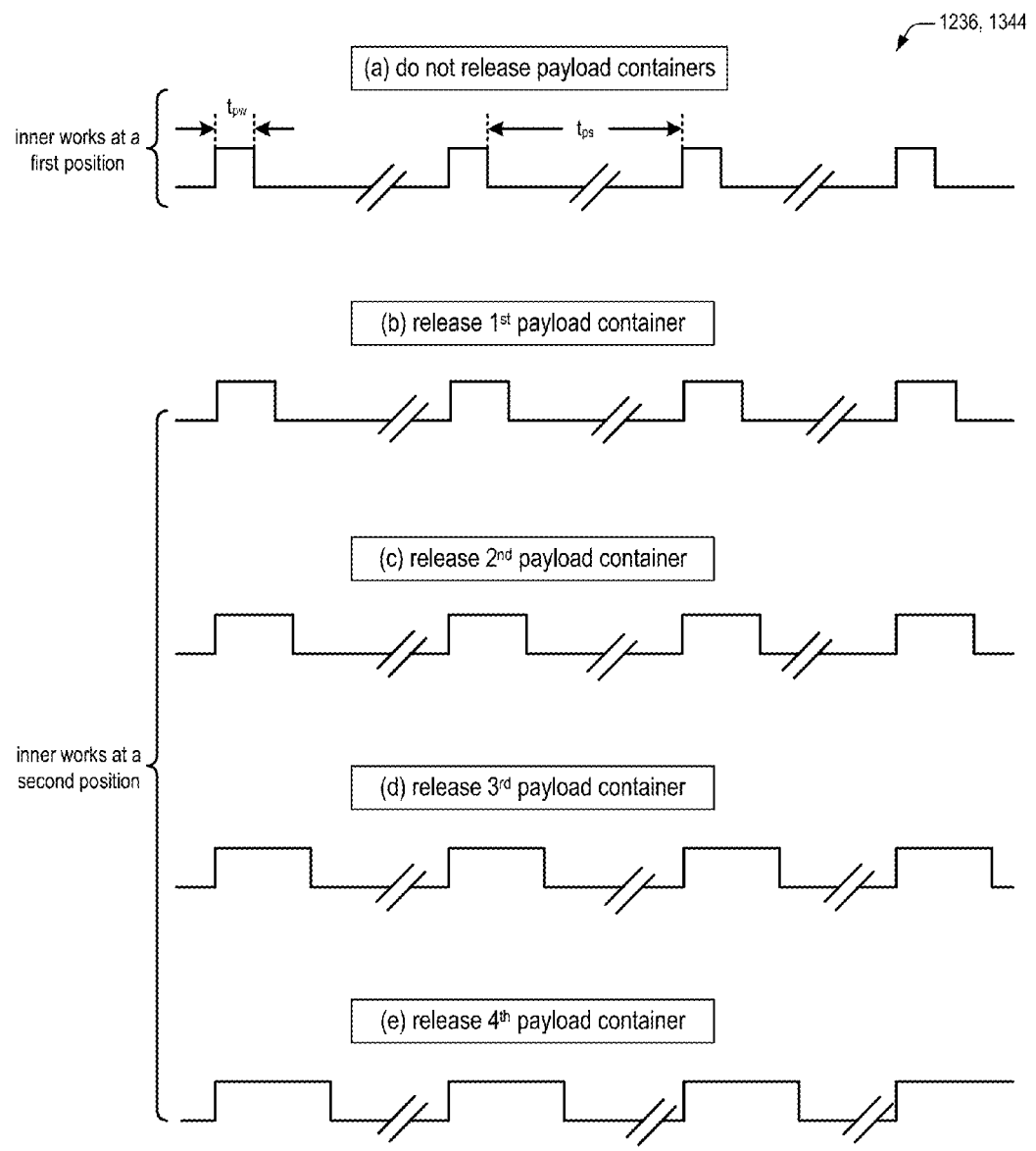
Fig. 17 Actuator signals for 4 payload container release sequence

AERIAL INSECT RELEASE APPARATUS

CROSS REFERENCE TO RELATED APPLICATIONS

This application is a Continuation-in-Part of pending non-Provisional U.S. application Ser. No. 13/784,469 filed Mar. 4, 2013, entitled AERIAL MATERIAL DISTRIBUTION APPARATUS, which is hereby incorporated by reference for all purposes. This application is related to pending non-Provisional U.S. application Ser. No. 14/517,866, filed Oct. 19, 2014, entitled AERIAL MATERIAL DISTRIBUTION METHOD AND APPARATUS.

FIELD

The present invention is directed to methods and apparatuses for aerial distribution of beneficial insects. In particular, the present invention is directed to methods and apparatuses for efficiently distributing beneficial insect payload containers by aerial means.

BACKGROUND

Crop dusting, or aerial top dressing, involves spraying crops with fertilizers, pesticides, and fungicides from an agricultural aircraft. Agricultural aircraft are often purpose built, and include fixed wing airplanes and helicopters. In most cases, the fertilizers, pesticides, and fungicides are applied in liquid form from a spraying apparatus affixed to the crop dusting aircraft. The spraying apparatus includes wet tanks which store the applied liquids, pressurization apparatus to transfer the applied liquids from the wet tanks to a spray boom, and spray nozzles arranged approximately symmetrically along the spray boom and oriented in a downward direction. Controls are provided near the pilot to control the release of the applied liquids to a selected target area. In most cases, the selected target area is a concentration of several acres of plants or trees such as an orchard or plowed field.

In order to control populations of harmful insects to crops, it is sometimes useful to release beneficial insects in close proximity to the crops being protected. Beneficial insects may be bred to attack and reduce populations of harmful insects, without harming crops.

SUMMARY

The present invention is directed to solving disadvantages of the prior art. In accordance with embodiments of the present invention, an apparatus to aerially dispense payload containers from an aircraft is provided. The apparatus includes an outer portion, including an opening to allow a payload container to leave the apparatus when the payload container is in alignment with the opening. The apparatus also includes an inner portion, configured to rotate within the outer portion. The inner portion has one or more cutouts that retain the payload container. The apparatus further includes an actuator, coupled to the inner portion, and a processor circuit. The processor circuit commands the actuator to rotate the inner portion to cause the payload container to align with the opening.

In accordance with other embodiments of the present invention, a method for aerially dispensing payload containers to a target area from an aircraft including a distribution apparatus is provided. The method includes sending, by a processor circuit, a command to an actuator to aerially dispense a payload container from the aircraft, and rotating, by the actuator in response to the command, an inner portion relative to an outer portion of the distribution apparatus to bring a cutout of the inner portion in alignment with an opening in the outer portion. The distribution apparatus includes the outer portion, the inner portion, the actuator, and the processor circuit. The method also includes dispensing, by the distribution apparatus, the payload container to the target area. The inner portion is configured to rotate within the outer portion, and the inner portion includes a cutout that captures the payload container when the payload container is not in alignment with the opening.

In accordance with still other embodiments of the present invention, a remotely-piloted aircraft for distributing beneficial insects to a target area, including a distribution apparatus is provided. The distribution apparatus includes an outer portion, which includes an opening to allow a payload container to leave the apparatus when the payload container is in alignment with the opening, and a removable cap to allow payload containers to be loaded into the distribution apparatus. The distribution apparatus also includes an inner portion, configured to rotate around an axis within the outer portion, including a plurality of cutouts that the payload containers fit within. The distribution apparatus further includes an actuator, coupled to the inner portion, and a processor circuit. The processor circuit commands the actuator to rotate the inner portion to cause a cutout to align with the opening. The distribution apparatus also includes a wireless receiver, coupled to the processor circuit, to receive commands to control the actuator, and one or more power sources to provide power to the processor circuit, the actuator, and the wireless receiver. An operator controls the remotely-piloted aircraft and the processor circuit with at least one of a wireless transmitter and a stored program in the processor circuit. When the wireless receiver receives a command to control the actuator, the processor circuit activates the actuator to rotate the inner portion such that a next cutout is in alignment with the opening. The beneficial insects are distributed to the target area after a payload container falls from the distribution apparatus.

One advantage of the present invention is it provides an effective means for aerial distribution of beneficial insects to a target area, especially where the target area is not in close proximity to the ground. Conventional ground-based beneficial insect applicators require blowers and in some cases ladders to reach the distribution area, and are therefore are much slower in application than aerial beneficial insect distribution apparatuses.

Another advantage of the present invention is that a conventional crop-dusting airplane or helicopter can be modified to use the present invention. Liquid material distribution apparatuses on the airplane or helicopter do not need to be removed, and in fact provide convenient means to attach the beneficial insect distribution apparatus. Therefore, the same airplane or helicopter can be used for both liquid and beneficial insect distribution.

Another advantage of the present invention is it provides a useful means of distributing beneficial insects accurately to a target area. By first loading beneficial insects into payload containers, the beneficial insects to not directly exit the distribution apparatus. Instead, the payload containers fall from the distribution apparatus to the target area, where the beneficial insects then leave the payload containers in close proximity to the target area.

Yet another advantage of the present invention is it minimizes damage to beneficial insects. Conventional airplanes have a forward airspeed considerably higher than helicopters, and must fly above a stall speed in order to remain airborne. Conventional helicopters at all times while airborne produce significant downward turbulence from rotor wash. The airplane airspeed and helicopter rotor wash may damage delicate wings of unprotected beneficial insects, resulting in ineffective application of beneficial insects. Remotely-piloted rotorcrafts produce less air turbulence than conventional helicopters or airplanes, thus allowing safe release of beneficial insects. Additionally, because the beneficial insects are protected from aircraft turbulence by the payload containers when the payload containers are released from the aircraft, delicate wings and other parts of the insects are protected.

Additional features and advantages of embodiments of the present invention will become more readily apparent from the following description, particularly when taken together with the accompanying drawings.

BRIEF DESCRIPTION OF THE DRAWINGS

FIG. 1*a* is a diagram illustrating components of a beneficial insect distribution system using an airplane in accordance with embodiments of the present invention.

FIG. 1*b* is a diagram illustrating an airplane side view in accordance with embodiments of the present invention.

FIG. 2*a* is a diagram illustrating components of a beneficial insect distribution system using a helicopter in accordance with embodiments of the present invention.

FIG. 2*b* is a diagram illustrating a helicopter side view in accordance with embodiments of the present invention.

FIG. 3 is a diagram illustrating a remotely piloted aircraft in accordance with embodiments of the present invention.

FIG. 4 is a diagram illustrating a side view of a mounted distribution apparatus in accordance with embodiments of the present invention.

FIG. 5 is a diagram illustrating an isometric view of an unmounted distribution apparatus in a payload container loading position in accordance with embodiments of the present invention.

FIG. 6 is a diagram illustrating an isometric view of a distribution apparatus while dropping a payload container in accordance with embodiments of the present invention.

FIG. 7 is a diagram illustrating an isometric view of a distribution apparatus and a dropped payload container in accordance with embodiments of the present invention.

FIG. 8*a* is a diagram illustrating a side view of a release cylinder in accordance with embodiments of the present invention.

FIG. 8*b* is a diagram illustrating a bottom view of a release cylinder in accordance with embodiments of the present invention.

FIG. 8*c* is a diagram illustrating a cap end view of a release cylinder in accordance with embodiments of the present invention.

FIG. 8*d* is a diagram illustrating an actuator end view of a release cylinder in accordance with embodiments of the present invention.

FIG. 9*a* is a diagram illustrating an end view of a cylinder cap in accordance with embodiments of the present invention.

FIG. 9*b* is a diagram illustrating a top view of a cylinder cap in accordance with embodiments of the present invention.

FIG. 9*c* is a diagram illustrating a bottom view of a cylinder cap in accordance with embodiments of the present invention.

FIG. 9*d* is a diagram illustrating an internal view of a cylinder cap in accordance with embodiments of the present invention.

FIG. 10*a* is a diagram illustrating an internal works assembly in accordance with a first embodiment of the present invention.

FIG. 10*b* is a diagram illustrating an internal works assembly in accordance with a second embodiment of the present invention.

FIG. 11*a* is a diagram illustrating a rotary end piece actuator end outside view in accordance with the first embodiment of the internal works assembly of the present invention.

FIG. 11*b* is a diagram illustrating a rotary end piece actuator end inside view in accordance with the first embodiment of the internal works assembly of the present invention.

FIG. 11*c* is a diagram illustrating a rotary end piece cap end outside view in accordance with the first embodiment of the internal works assembly of the present invention.

FIG. 11*d* is a diagram illustrating a rotary end piece cap end inside view in accordance with the first embodiment of the internal works assembly of the present invention.

FIG. 11*e* is a diagram illustrating spar members in accordance with the first embodiment of the internal works assembly of the present invention.

FIG. 12 is a block diagram illustrating a wired beneficial insect distribution system circuit in accordance with a first embodiment of the present invention.

FIG. 13 is a block diagram illustrating a wireless beneficial insect distribution system circuit in accordance with a second embodiment of the present invention.

FIG. 14*a* is a flowchart illustrating a payload container loading process in accordance with a first embodiment of the present invention.

FIG. 14*b* is a flowchart illustrating a payload container loading process in accordance with a second embodiment of the present invention.

FIG. 15 is a flowchart illustrating a manned aircraft payload container distribution process in accordance with a first embodiment of the present invention.

FIG. 16 is a flowchart illustrating an unmanned aircraft payload container distribution process in accordance with a second embodiment of the present invention.

FIG. 17 is a diagram illustrating actuator signals for a four payload container release sequence in accordance with the preferred embodiment of the present invention.

DETAILED DESCRIPTION

In some cases, it is desirable to apply beneficial insects to plants and trees, in order to control populations of harmful insects that destroy leaves, flowers, and stems. In some cases, beneficial insects may be released on the ground in the hope they will be able to reach all parts of plants or trees that require protection. This may be suitable for plants or trees in close proximity to the ground, but ground release may not be able to reach taller plants or trees. Many such plants or trees, such as avocado trees, can grow to heights of 20 feet or more.

It is desirable to apply beneficial insects to plants and trees more efficiently than a ground-based release system can provide. Aerial dispersal of beneficial insects is the more efficient manner of covering rough terrain than by quad or tractor. For example, the pilot of a rotary winged aircraft simply hovers over the drop site and is unaffected by obstructions on the ground. It is also desirable to use existing crop-dusting aircraft to apply beneficial insects since new crop-dusting aircraft can be very expensive. The present invention is directed to providing reliable means of aerially distributing beneficial insects to a selected target area.

Referring now to FIG. 1a, a diagram illustrating components of a payload container 124 dispersal system using an airplane 104 is shown. Airplane 104 is a conventional fixed-wing airplane used for crop-dusting and/or beneficial insect release, and is suitable for low altitude operation. Although airplane 104 is illustrated as a high-wing aircraft, any sort of suitable aircraft including low-wing monoplanes may be used.

Airplane 104 includes a spray boom 108, used for distributing liquids to plants and trees. Airplane 104 is modified by adding one or more distribution apparatuses 112 for distributing payload containers 124 to a given target area 116. Each payload container 124 contains a number of beneficial insects. Distribution apparatus 112 is described in more detail in FIGS. 4 through 13. Although FIG. 1*a* illustrates payload containers 124 distributed by a pair of distribution apparatus 112, it should be understood that payload containers 124 may be distributed by any number of distribution apparatuses 112, including all distribution apparatus 112 on airplane 104. The present invention allows for multiple distribution apparatuses 112 to be operated either independently, or in a coordinated fashion. The target area 116 includes fields, orchards, farms, and any other area that payload container 124 is to be distributed on.

Referring now to FIG. 1*b*, a diagram illustrating an airplane 104 side view in accordance with embodiments of the present invention is shown. Airplane 104 includes spray boom 108 and one or more distribution apparatuses 112.

Referring now to FIG. 2*a*, a diagram illustrating components of a beneficial insect distribution system using a helicopter 204 in accordance with embodiments of the present invention is shown. Helicopter 204 is a rotary-winged aircraft capable of low-speed flying and hovering. Helicopter 204 includes a spray boom 108 as well as one or more distribution apparatuses 112. Helicopter 204 may also include one or more wet tanks 212; however these are not used in the present invention and are used for liquid distribution from spray boom 108. Unlike airplane 104, helicopter 204 produces rotor wash 208 below the spinning rotor in a downward direction. Although FIG. 2*a* illustrates a payload container 124 distributed by a pair of distribution apparatuses 112, it should be understood that payload containers 124 may be distributed by any number of distribution apparatuses 112, including all distribution apparatus 112 on helicopter 204. The present invention allows for multiple distribution apparatuses 112 to be operated either independently, or in a coordinated fashion.

Referring now to FIG. 2*b*, a diagram illustrating a helicopter 204 side view in accordance with embodiments of the present invention is shown. Helicopter 204 includes a spray boom 108 and one or more distribution apparatuses 112.

Referring now to FIG. 3, a diagram illustrating a remotely piloted aircraft 304 in accordance with embodiments of the present invention is shown. As described herein, the term "aircraft" includes manned airplanes 104 and helicopters 204, in addition to unmanned remotely-piloted aircraft 304. Remotely-piloted aircraft 304 may fly under direction of a ground-based operator using a wireless transceiver operator interface 1308, or autonomously or semi-autonomously using a stored program 1352. Remotely-piloted aircraft 304 include both fixed-wing and rotary-wing aircraft 304.

Although remotely-piloted aircraft 304 in some embodiments is a remote control fixed-wing airplane or blimp/balloon/glider, in the preferred embodiment the remotely-piloted aircraft 304 is a rotorcraft such as a remotely-piloted helicopter 304. In the preferred embodiment, the remotely-piloted aircraft 304 is a multiple-rotor aircraft such as an Arducopter 3DR Hexa C produced by 3D Robotics and available from http://www.udrones.com, where each of multiple rotors 308 are outboard from a central chassis 324.

Remotely-piloted aircraft 304 includes a remotely-piloted aircraft central control 312, which includes a drone processor 1316 and wireless transceiver 1304*b*, and controls each of the rotors 308 and corresponding propulsion motors and sensors on the remotely-piloted aircraft 304. The sensors may include one or more cameras, airspeed sensors, GPS receivers, altitude sensors, or fuel sensors for the motors controlling each of the rotors 308.

The remotely-piloted aircraft 304 includes one or more distribution apparatuses 112, power sources 1208, 1320, and a processor circuit 1204, 1324. Distribution apparatus 112 includes an opening 320 through which payload containers 124 are dropped to a target area 116. Payload power source and control circuit 316 includes power sources 1320 and a processor circuit 1324.

Beneficial insects aid fruit production by limiting or eliminating populations of harmful insects in orchards and areas where crops are being grown. For example, beneficial insects include flying insects, eggs, and/or larvae.

A remotely-piloted aircraft 304 has advantages for beneficial insect distribution over conventional airplanes 104 or helicopters 204. Airplanes 104 have a forward airspeed considerably higher than helicopters 204, and must fly above a stall speed in order to remain airborne. Helicopters 204 at all times while airborne produce significant turbulence from rotor wash 208. The higher kinetic energy due to airplane 104 airspeed and helicopter rotor wash 208 may damage delicate wings of beneficial insects, resulting in ineffective application of beneficial insects. The remotely-piloted aircraft 304 illustrated in FIG. 3 has significantly less kinetic energy—which minimizes air turbulence and allows safer release of beneficial insects.

Referring now to FIG. 4, a diagram illustrating a side view of a mounted distribution apparatus 112 in accordance with the embodiments of the present invention is shown. Distribution apparatus 112 is a cylindrical structure enclosing a rotary dispenser that drops payload containers 124 to target areas 116. Distribution apparatus 112 is mounted to an aircraft mounting pylon or structure 404, generally on a bottom surface of an airplane 104, helicopter 204, or remotely-piloted aircraft 304. One or more mounting rails 428 may in some embodiments be attached to the exterior of a release cylinder 408 to provide an attachment point for coupling the distribution apparatus 112 to the aircraft 104, 204, 304. In the preferred embodiment, twist ties or tie wraps 424*b* provide the actual attachment, but in other embodiments string, elastic cord, paracord, glues, Velcro, or other forms of attachment may be used. It is preferred that the attaching mechanisms 424*b* be temporary in nature, in order to quickly attach the distribution apparatus 112. For example, this may allow a first distribution apparatus 112*a* on an airplane 104, helicopter 204, or remotely-piloted aircraft 304 to be distributing beneficial insects 704 while a second distribution apparatus 112*b* is on the ground being serviced or loaded with new payload containers 124.

Distribution apparatus 112 includes a release cylinder 408, which houses one or more payload containers 124. Release cylinder 408 has a release cylinder opening 320, 432 through which payload containers 124 are released. In some embodiments, a cap 412 is attached to an open end of the release cylinder 408, and is secured to the release cylinder 408 using lugs 440 attached to both parts 408, 412 and securing straps 424a between the lugs 440. In one, there are five lugs 440 around the periphery of the release cylinder 408 and cap 412, where the mounting rail 428 includes a lug 440 feature. However, in other embodiments there may be fewer or more than five lugs 440. In other embodiments, the cap 412 is secured to the release cylinder 408 by screwing the cap 412 onto threads on the open end of the release cylinder 408, by using Velcro, tape, magnets, or any other known form of attachment. The securing straps 424a are preferably rubber bands, but in other embodiments may be any form of strap that secures release cylinder 408 to the cap 412. Note that securing straps 424a may not be required where a screw-on cap 412, Velcro, or other means of attaching the cap 412 to the release cylinder 408 are used.

In the preferred embodiment, the cap 412 is temporarily attached to the release cylinder 408, and payload containers 124 are individually loaded in sequence through the release cylinder opening 320, 432. It should be noted that although permanently attaching the cap 412 to the release cylinder 408 makes the distribution apparatus 112 simpler and lower in cost, maintenance of the internal works assembly 504 may be more difficult than embodiments that provide a removable cap 412. Additionally, when the cap 412 is permanently attached, only one payload container 124 at a time may be loaded, and the internal works assembly 504 must be rotated for each new payload container 124 and to return the internal works assembly 504 to a first position. A first position is an internal works 504 position whereby a payload container 124 is not released from the distribution apparatus 112, and is discussed in more detail in the accompanying description.

An actuator 416 is attached to a closed end of the release cylinder 408, which is the opposite end of the release cylinder 408 than the end the cap 412 is attached to. In the preferred embodiment, the actuator 416 is a servo of the type used for sail winches, such as a GWS 125S 1T (http://www.pololu.com/product/522), manufactured by Pololu Robotics and Electronics. Sail winches are multi-turn potentiometers that are preferable since they rotate through a full 360 degrees. In other embodiments the actuator 416 is an electric motor, servo, or solenoid. Actuator leads 420 between the actuator 416 and a processor circuit 1204, 1324 allow the actuator 416 to be controlled by user or stored program 1240, 1352 command. In the preferred embodiment, the actuator leads 420 attach to the distribution apparatus 112 or actuator 416 through a tool-free electrical connector. This would allow easy attachment and removal of a distribution apparatus 112 from an airplane 104, helicopter 204, or remotely-piloted aircraft 304a.

Because the distribution apparatus 112 may be deployed aboard an aircraft 104, 204, 304, it is desirable to construct the distribution apparatus 112 from lightweight rigid materials. Various polymers including ABS plastic, PVA or PLA plastics, carbon fibers, and fiberglass are suitable, in addition to epoxy and lightweight metals such as aluminum. The payload containers 124 may be lightweight paper tubes such as coin wrappers or cardboard, or various polymers and plastics including water soluble PVA in the preferred embodiment. In the preferred embodiment, the payload containers 124 are constructed from biodegradable material. PVA is a low temperature water-soluble thermoplastic, but is generally more expensive than ABS plastic material. PLA is a more environmentally-friendly material that can be biodegradable depending on how it is disposed of PLA melts at a lower temperature and is less expensive than ABS plastic material. In some embodiments, payload containers 124 have individual lids to temporarily contain beneficial insects 704. In such cases, the lids are removed just prior to installing the payload containers 124 to the release cylinder 408.

Referring now to FIG. 5, a diagram illustrating an isometric view of an unmounted distribution apparatus 112 in a payload container loading position in accordance with embodiments of the present invention is shown. When in the loading position, the cap 412 is removed from the distribution apparatus 112, so that the payload containers 124 may be loaded lengthwise into an internal works assembly 504 within the distribution apparatus 112. The cap 412 is removed after the securing straps 424a are removed from the securing strap mounting points 816.

Payload containers 124 are loaded into the distribution apparatus 112 when the aircraft 104, 204, 304 is on the ground and not over the target area 116. Once loaded, the payload containers 124 are held between the internal works assembly 504 and the inner surface of the release cylinder 408. In the preferred embodiment, no springs 1012 are present. However, in other embodiments, one or more springs 1012 attached to the internal works assembly 504 provide outward spring force 508 to eject payload containers 124 through the release cylinder opening 432 in the release cylinder 408. In some embodiments, one spring 1012 is provided per payload container 124, while in other embodiments, multiple springs 1012 are provided per payload container 124.

In order to load payload containers 124 into the distribution apparatus 112, the internal works assembly 504 is oriented such that no payload containers 124 are in alignment with the release cylinder opening 320, 432. That is, in order to capture payload containers 124, each payload container 124 must be captured between the internal works assembly 504 and the release cylinder 408. This keeps payload containers 124 from being inadvertently released from the release cylinder 408 until the desired time. Once airborne and over the target area 116, the actuator 416 rotates the internal works assembly 504 to drop payload containers 124.

Referring now to FIG. 6, a diagram illustrating an isometric view of a mounted distribution apparatus 112 while dropping a payload container 124 in accordance with embodiments of the present invention is shown. FIG. 6 illustrates an aerial mounted distribution apparatus 112 releasing a payload container 124, and therefore illustrates the internal works assembly 504 in a second position. The aircraft 104, 204, 304 as well as the aircraft mounting pylon or structure 404 are not shown for clarity. The cap 412 is secured to the release cylinder 408 by the securing straps 424a, and the internal works assembly 504 is rotated such that a payload container 124 is aligned with the release cylinder opening 432. Either gravity and/or spring force 508 causes the payload cylinder 124 to fall free from the distribution apparatus 112.

FIG. 6 also illustrates an alternate condition under which payload containers 124 may be loaded in a distribution apparatus 112, without removing the cap 412. Once cutouts 1020a, 1020b are aligned with the release cylinder opening 432, payload containers 124 may be loaded one at a time. After each payload container 124 is loaded, the inner works 504 is rotated such that another cutout 1020a, 1020b is aligned with the release cylinder opening 432. After a last payload container 124 is loaded, the inner works assembly is rotated such that no cutouts 1020a, 1020b are aligned with the release cylinder opening 432. This prevents premature release of payload containers 124.

Referring now to FIG. 7, a diagram illustrating an isometric view of a mounted distribution apparatus 112 and a dropped payload container 124 in accordance with embodiments of the present invention is shown. FIG. 7 illustrates a payload container 124 that has fallen free of the distribution apparatus 112, and has begun to distribute beneficial insects 704 to a target area 116. The internal works assembly 504 is shown in a second position, where a cutout 1020 is aligned with the release cylinder opening 432. The aircraft 104, 204, 304 as well as the aircraft mounting pylon or structure 404 are not shown for clarity.

The payload container 124 has an open end 708, through which the beneficial insects 704 are released. The opposite end of the payload container 124 is closed. When loaded into the distribution apparatus 112, the open end 708 is in contact with either the inner surface of the cap 412, or else the opposite end of the release cylinder 408, where the actuator 416 is located.

Distribution apparatus 112 is useful for the release of certain beneficial insects 704 that in the conventional art are dispersed by a blower or released by hand. In most cases, the beneficial insects 704 are in the form of flying beneficial insects such as tamarixia wasps, although either eggs or larvae may be substituted. Typically the beneficial insects 704 of this invention are not mixed with a substrate, and are released to the target environment as-is.

The beneficial insects 704 leave the payload container 124 due to movement of the payload container 124, winds, and light. Movement of the payload container 124 imparts centrifugal and other forces to the beneficial insects 704, thus moving them toward the open end 708 of the payload container 124 where the beneficial insects 704 may escape. Winds may enter the open end of the payload container 708, and aid in moving the beneficial insects 704 out of the payload container 124. Furthermore, experience with beneficial insects 704 has shown that beneficial insects 704 are attracted to light. Therefore, if the open end 708 is lighter than the interior walls of the payload container 124, the beneficial insects 704 will be naturally motivated to leave the payload container 124.

Referring now to FIG. 8*a*, a diagram illustrating a side view of a release cylinder 408 in accordance with embodiments of the present invention is shown. Release cylinder 408 is a cylindrical structure that forms the basis and main structure for the distribution apparatus 112. The release cylinder 408 is the outer portion of the distribution apparatus 112. Release cylinder 408 has an actuator end 804, where an actuator 416 is attached, and an opposite cap end 808, where a cap 412 is secured to the release cylinder 408. In the preferred embodiment, the release cylinder 408 has two or more securing strap mounting points 816 or lugs 440, which provide attachment points for securing straps 424*a* between the actuator end of the release cylinder 804 and the cap 412. In other embodiments, securing strap mounting points 816 and securing straps 424*a* are not required. These embodiments will be discussed relative to FIGS. 9*a*-9*d*.

Release cylinder 408 also has a mounting rail 428 structure to provide an attachment point for the release cylinder 408 to the aircraft 104, 204, 304. As described with reference to FIG. 4, securing straps 424*b* couple the mounting rail 428 to the aircraft mounting pylon or structure 404. In order to provide clearance for the cap 412, a recessed area 812 is provided on the cap end 808 in line with the mounting rail 428.

Referring now to FIG. 8*b*, a diagram illustrating a bottom view of a release cylinder 408 in accordance with embodiments of the present invention is shown. FIG. 8*b* illustrates the mounting position for the actuator 416, which includes a hole through which the actuator 416 interfaces with the internal works assembly 504. Significantly, FIG. 8*b* also shows the release cylinder opening 320, 432 through which the distribution apparatus 112 releases payload containers 124.

Referring now to FIG. 8*c*, a diagram illustrating a cap end of a release cylinder 808 in accordance with embodiments of the present invention is shown. FIG. 8*c* shows the actuator hole 820 at the actuator end of the release cylinder 804 as well as the mounting rail 428 and the securing strap mounting points 816. The mounting rail 428 as well as each of the securing strap mounting points 816 is used as bearing surfaces by securing straps 424*a* to secure the cap 412 to the release cylinder 408. Although five such mounting points 816, 428, 440 are shown, any number of mounting points may be used as long as the cap 412 is securely attached to the release cylinder 408.

Referring now to FIG. 8*d*, a diagram illustrating an actuator end view of a release cylinder 804 in accordance with embodiments of the present invention is shown. FIG. 8*d* illustrates more detail involved with the actuator 416 attachment to the release cylinder 408, including the actuator hole 820 and the recess to mount the actuator 824.

Referring now to FIG. 9*a*, a diagram illustrating an end view of a cylinder cap 412 in accordance with embodiments of the present invention is shown. The end view illustrates securing strap mounting points 816, which provide attachment points to corresponding securing strap mounting points 816 on the release cylinder 408. The center securing strap mounting point 816 corresponds to the mounting rail 428 shown in FIGS. 8*a*, 8*c*, and 8*d*.

Referring now to FIG. 9*b*, a diagram illustrating a top view of a cylinder cap 412 in accordance with embodiments of the present invention is shown. The top view illustrated in FIG. 9*b* corresponds to section A-A of FIG. 9*a*. An optional rotation axle 904 may extend inward from the center of cap 412. The rotation axle 904 engages the internal works assembly 504 and provides an axis that the internal works assembly 504 rotates around, in addition to a shaft of the actuator 416. The actuator shaft 416 engages the opposite end of the internal works 504 with a friction fit.

Referring now to FIG. 9*c*, a diagram illustrating a bottom view of a cylinder cap 412 in accordance with embodiments of the present invention is shown. The bottom view illustrated in FIG. 9*c* corresponds to section B-B of FIG. 9*a*. The optional rotation axle 904 extends inward from the center of cap 412. The rotation axle 904 engages the internal works assembly 504 and provides a second axis that the internal works assembly 504 rotates around, in addition to the actuator 416 shaft. FIG. 9*c* also illustrates the release cylinder opening 432.

Referring now to FIG. 9*d*, a diagram illustrating an internal view of a cylinder cap 412 in accordance with embodiments of the present invention is shown. FIG. 9*d* illustrates the optional rotation axle 904, the securing strap mounting points 816, and the release cylinder opening 432.

Referring now to FIG. 10*a*, a diagram illustrating an internal works assembly 504*a* in accordance with a first embodiment of the present invention is shown. The internal works assembly 504*a* rotates within the release cylinder 408 and cap 412, and holds a predetermined number of payload containers 124. The internal works assembly 504*a* is the inner portion of the distribution apparatus 112. In the embodiment illustrated, up to five payload containers 124 may be stored in one distribution apparatus 112. In other embodiments, less than or more than five payload containers 124 may be stored.

Internal works assembly 504a includes rotary end pieces 1004a and 1004b joined by rigid spar members 1008. In the embodiment illustrated, there are five spar members 1008. Spar members 1008 maintain synchronization between rotary end pieces 1004a, 1004b to predictably and consistently rotate the internal works assembly 504a as a single unit.

Each of the rotary end pieces 1004a, 1004b has a payload container cutout 1020a for each payload container 124. These cutouts 1020a are sized for a fit to the payload container 124 dimensions. Larger payload containers 124 will require a fewer number of larger payload container cutouts 1020a, while smaller payload containers 124 allow a larger number of smaller payload container cutouts 1020a. Internal works assembly 504a also includes an actuator bushing 1016, which mechanically interfaces to a shaft of actuator 416 and provides bearing surfaces that allow the actuator 416 to rotate the internal works assembly 504a. In some cases, portions of the shaft of the actuator 416 that engages the actuator bushing 1016 may need to be ground down or otherwise modified in order to fit without interference.

In an alternate embodiment, there is a spring 1012 included within each payload container cutout 1020a. The spring 1012 exerts outward force 508 against each loaded payload container 124, and aids in ejecting the payload container 124 from the distribution apparatus 112 when a payload container cutout 1020a is open to the release cylinder opening 320, 432. Spring 1012 may be any suitable spring material and the spring force should be selected in order to not damage payload containers 124 or cause them to bind against the internal surface of the release cylinder 408. In one embodiment, the springs 1012 are springs from a simple ballpoint pen that are cut in half. It should be noted that in the preferred embodiment, the springs 1012 are not included due to potential binding. Although the springs 1012 may provide an advantage if the release cylinder opening 432 is oriented sideways, for downward orientation of the release cylinder opening 432, gravity and the payload container 124 mass are sufficient to eject payload containers 124 from the distribution apparatus 112 in lieu of springs 1012.

Referring now to FIG. 10b, a diagram illustrating an internal works assembly 504b in accordance with a second embodiment of the present invention is shown. The internal works assembly 504b rotates within the release cylinder 408 and cap 412, and holds a predetermined number of payload containers 124. The internal works assembly 504b is the inner portion of the distribution apparatus 112. In the embodiment illustrated, up to four payload containers 124 may be stored in the distribution apparatus 112. In other embodiments, less than or more than four payload containers 124 may be stored. The embodiment illustrated in FIG. 10b is suitable for rigid payload containers 124 made out of materials such as plastics or glass, instead of more flimsy or lightweight materials such as paper coin wrappers.

Unlike the first embodiment illustrated in FIG. 10a, the second embodiment requires no spar members 1008 since a central payload container axle 1024 is used instead. The payload container axle 1024 has a hole on one end that serves as a payload container axle interface 1032 and receives a shaft of the actuator 416. In the preferred embodiment, there is a tight friction fit between the actuator 416 shaft and the payload container axle interface 1032. However, in other embodiments glue or another compound may be required to ensure a rigid fit. The opposite end of the payload container axle 1024 has an interface similar to payload container axle interface 1032, and engages rotation axle 904. The payload container axle 1024 has concave payload container cutouts 1020b around the periphery that correspond with the outside of the payload containers 124 and aid in moving the payload containers 124 around the axis of the payload container axle interface 1032.

Internal works assembly 504b includes a payload container stop 1028, which provides a solid surface against the open end 708 of payload containers 124 to contain beneficial insects 704. In some embodiments, the payload container stop 1028 may be movable along the length of the payload container axle 1024 in order to accommodate different length payload containers 124. In other embodiments, different internal works assemblies 504b may be created with the payload container stop 1028 fixed at different positions, in order to accomplish the same goal.

In some embodiments, a payload container collar 1036 is provided. The payload container collar 1036 is attached to the payload container stop 1028, and has a step to receive a smaller end of payload containers 124 as shown in FIGS. 5-7. In other embodiments where payload containers 124 have a single and consistent (i.e. non-stepped) profile, a payload container collar 1036 may not be required.

In some embodiments, there is a spring 1012 included within each payload container cutout 1020b. The spring 1012 exerts outward force against each loaded payload container 124, and aids in ejecting the payload container 124 from the distribution apparatus 112 when a payload container cutout 1020b is open to the release cylinder opening 432. Springs 1012 are selected in a manner consistent to that described with respect to FIG. 10a. However, in the preferred embodiment, springs 1012 are not required.

Referring now to FIG. 11a, a diagram illustrating a rotary end piece 1004b actuator end outside view in accordance with the first embodiment of the internal works assembly 504a of the present invention is shown. The actuator end of the rotary end piece 1004b has an actuator bushing 1016 for engaging the actuator 416, and cutouts 1020a for retaining payload containers 124.

Referring now to FIG. 11b, a diagram illustrating a rotary end piece 1004b actuator end inside view in accordance with the first embodiment of the internal works assembly 504a of the present invention is shown. The inside surface of the actuator end of the rotary end piece 1004b has a spar member mounting hole 1108 for each spar member 1008. Spar members 1008 are permanently attached to the rotary end piece 1004b by a suitable attachment method depending on the material properties of the spar members. That is, brazing, soldering, or welding for steel, gluing for most polymers, etc.

Referring now to FIG. 11c, a diagram illustrating a rotary end piece 1004a cap end outside view in accordance with the first embodiment of the internal works assembly 504a of the present invention is shown. The cap end of the rotary end piece 1004a has a rotation axle recess 1112 for engaging the rotation axle 904, and cutouts 1020a for retaining payload containers 124. In some embodiments, one or more springs 1012 are within each of the cutouts.

Referring now to FIG. 11d, a diagram illustrating a rotary end piece 1004a cap end inside view in accordance with the first embodiment of the internal works assembly 504a of the present invention is shown. The inside surface of the actuator end of the rotary end piece 1004b has a spar member mounting hole 1108 for each spar member 1008. Spar members 1008 are permanently attached to the rotary end piece 1004*a* by a suitable attachment method depending on the material properties of the spar members. That is, brazing, soldering, or welding for steel, gluing for most polymers, etc.

Referring now to FIG. 11*e*, spar members 1008 are shown. Spar members 1008 are rigid members coupling the two rotary end pieces 1004*a*, 1004*b*. Although spar members 1008 are shown with essentially square cross section, they may be any cross section that achieves the requirement of rigidly coupling the two rotary end pieces 1004*a*, 1004*b* while not inhibiting the loading or release of any payload containers 124 from the distribution apparatus 112.

Referring now to FIG. 12, a block diagram illustrating a wired beneficial insect distribution system circuit in accordance with a first embodiment of the present invention is shown. The wired beneficial insect distribution system circuit may be used when a manned aircraft 104, 204 is used to release the beneficial insects 704, although in some embodiments a wireless beneficial insect distribution system circuit shown in FIG. 13 may be preferable. An operator pushes a normally-open pushbutton 1212 to cause the distribution apparatus 112 to index to a next payload container 124 position. In other embodiments, a numeric keypad or other user interface, including a graphical user interface, may be used to select a specific payload container 124 for release. If a payload container 124 is present at the next position (cutout 1020*a*, 1020*b*), the payload container 124 will be released by the distribution apparatus 112. The pushbutton is conditioned by a resistor 1216, and the pushbutton 1212 itself is debounced by hardware and/or software/firmware of the processor circuit 1204. In the preferred embodiment, the resistor 1216 is approximately 10K Ohms. The act of pushing the pushbutton 1212 serves as a drop next payload container command 1228 to the processor circuit 1204. After a last payload container 124 has been released, pushing the pushbutton 1212 returns the inner works to either a first (where a cutout 1020*a*, 1020*b* is not aligned with the release cylinder opening 432) or a second position (where a cutout 1020*a*, 1020*b* is aligned with the release cylinder opening 432). This facilitates re-loading of a distribution apparatus 112 depending on whether the cap 412 is present when the distribution apparatus 112 is being loaded. Which of the two positioning methods is used would be determined by the stored program 1240.

The distribution apparatus 112 includes an actuator 416 that is controlled by a processor circuit 1204 and stored program 1240. In the preferred embodiment, the actuator 416 is a GWS 125S 1T sail servo, which runs on approximately +4.5 Volts DC. The processor circuit 1204 converts detected pulses from the pushbutton 1212 into an actuator signal 1236 that indexes the inner works assembly 504 to loading or release positions. The processor circuit 1204 in a preferred embodiment is a single board computer such as an Arduino Nano (http://arduino.cc/en/Main/arduinoBoard-Nano), which includes a central processing unit (CPU), volatile and non-volatile memories, and input/output (I/O) circuits. In other embodiments the processor circuit 1204 may be a state machine, field-programmable gate array (FPGA), or other forms of logic and/or firmware and software. Additionally, in other embodiments, the processor circuit 1204 is the same processor circuit 312 used to control a drone or other remotely piloted vehicle 304.

The non-volatile memory of the processor circuit 1204 (and 1324) includes computer instructions for interpreting commands from the pushbutton 1212 or wireless receiver 1304*b*, and in response controlling the actuator 416. The computer instructions store at least a first predetermined time and a second predetermined time. The first predetermined time corresponds to the amount of time required to rotate the inner works assembly 504 to a first position, where a cutout 1020*a*, 1020*b* is not aligned with the release cylinder opening 432. The second predetermined time corresponds to the amount of time required to rotate the inner works assembly 504 from a current second position corresponding to a current cutout 1020 or payload container 124 in alignment with the opening 320, 432 to a next second position corresponding to a next cutout 1020 or payload container 124 in alignment with the opening 320, 432. It should be noted that alternate predetermined time periods may be used, depending on the choice of the actuator 416 and the specific rotation operations desired.

In the preferred embodiment, on first powering up the processor circuit 1204 sends a 1 millisecond (ms) pulse to the actuator 416—which equates to the "zero" or first position. In order to rotate the actuator 416 to each of the release positions, the processor circuit 1204 in the preferred embodiment sends a longer pulse as shown in FIG. 17: It should be noted that the time to rotate between positions is very user and configuration dependent and generally non-critical, and may be different than the values indicated.

In lieu of manually dropping an individual payload container 124 following a push of the pushbutton 1212, a stored program 1240 in the processor circuit 1204 may drop payload containers 124 automatically following initiation from a first push of pushbutton 1212. In one embodiment, the stored program 1240 directs the processor circuit 1204 to release payload containers 124 in a timed sequence. In another embodiment, the stored program 1240 directs the processor circuit 1204 to release payload containers 124 at a predetermined waypoint or waypoints.

In other embodiments, the processor circuit 1204 may release payload containers 124 in other sequences, such as #1, then #3, then #2, then #4, and so on. Depending on how payload containers 124 are arranged within the distribution apparatus 112, this may require a programmable latch associated with each payload container 124. The latch would prevent release of a payload container 124 in the second position, until such time as the latch was activated. Accordingly, the processor circuit 1204 and stored program 1240 may rotate the internal works assembly 504 either clockwise or counterclockwise, depending on user input or the stored program 1240.

Power sources 1208 provide +5 Volts DC to the pushbutton 1212 and processor circuit power 1224 to the processor circuit 1204. Power sources 1208 is typically one or more batteries, but may also be supercapacitors, solar cells, or other forms of electrical energy storage. The power sources 1208 may also provide power from one or more alternators or generators on the aircraft 104, 204. In some embodiments, power sources 1208 may also provide actuator power 1232 to the actuator 416. However, in the embodiment where an Arduino Nano is the processor circuit 1204, the processor circuit power 1224 is +9 Volts DC. In other embodiments where the processor circuit 1204 is incapable of providing the necessary actuator power 1232, the actuator power 1232 is provided directly from the power sources 1208 instead.

Referring now to FIG. 13, a block diagram illustrating a wireless beneficial insect distribution system circuit in accordance with a second embodiment of the present invention is shown. FIG. 13 illustrates an embodiment that would be required for unmanned aircraft 304, but could alternatively be used for manned aircraft 104, 204. In the latter case, if the control wiring is difficult to rout it may be more convenient to use the arrangement shown in FIG. 13 instead.

The wireless beneficial insect distribution system circuit includes an operator interface 1308. The operator interface 1308 may be an off-the shelf radio controller such as used for model airplanes, boats, or cars, or may be a custom-made assembly for this specific purpose. Operator interface 1308 includes a pushbutton 1312, wireless transceiver 1304*a*, and battery 1348. The battery 1348 powers the wireless transceiver 1304*a*, and the pushbutton 1312 is similar to pushbutton 1212.

Wireless transceiver 1304*a* transmits a radio frequency (RF) drop next payload container command 1328 to another wireless transceiver 1304*b* on a remotely-piloted aircraft 304. The wireless transceiver 1304*b* in turn transmits the drop next payload container command 1328 to a drone processor 1316. The drone processor 1316 is provided as part of the remotely-piloted aircraft 304, and includes user specified and programmable features for payload control.

The drone processor 1316 in turn transfers the drop next payload container command 1328 to a processor circuit 1324. The processor circuit 1324 has the same functionality as processor circuit 1204, and may have the same hardware/software/firmware. Processor circuit 1324 controls the actuator 416 of the distribution apparatus 112 with actuator signal 1344. Actuator signal 1344 indexes the actuator 416 from a loading position, through various release positions, and in some embodiments, back to a loading position after all payload containers 124 have been released by the distribution apparatus 112. The actuator signal 1344 is a timed pulse where the millisecond pulse duration determines the angular displacement the internal works assembly 504 rotates. In the preferred embodiment, the processor circuit 1324 is the drone processor 1316, and the drone processor 1316 executed the stored program 1352.

In lieu of manually dropping an individual payload container 124 following a push of the pushbutton 1312, a stored program 1352 in the processor circuit 1324 may drop payload containers 124 automatically following initiation from a first push of pushbutton 1312. In one embodiment, the stored program 1352 directs the processor circuit 1324 to release payload containers 124 in a timed sequence. In another embodiment, the stored program 1352 directs the processor circuit 1324 to release payload containers 124 at a predetermined waypoint. Additionally, the same processor 1204 and stored program 1240 embodiments discussed with respect to FIG. 12 apply to FIG. 13, as well.

Power sources 1320 provide drone power 1332 to the drone processor 1316, processor circuit power 1336 to the processor circuit 1324, and actuator power 1340 to the actuator 416. Power sources 1320 is typically one or more batteries, but may also be supercapacitors, solar cells, or other forms of electrical energy storage. Drone power 1332 is whatever the drone processor 1316 requires, and in the preferred embodiment where the remotely-piloted aircraft 304 is the helicopter drone described earlier, drone power 1332 is +11.1 Volts DC. In the preferred embodiment where an Arduino Nano is the processor circuit 1324, the processor circuit power 1336 is +9 Volts DC. In embodiments where the power sources 1320 or drone processor 1316 are able to provide more actuator power 1340 than the processor circuit 1324, it would be advantageous to have the power sources 1320 or drone processor 1316 provide the actuator power 1340 instead. FIG. 13 illustrates the case where power sources 1320 sources the +5 Volts DC actuator power 1340 to the actuator 416.

Referring now to FIG. 14*a*, a flowchart illustrating a payload container 124 loading process in accordance with a first embodiment of the present invention is shown. Payload containers 124 of the present invention are loaded when the aircraft 104, 204, 304 is on the ground and not aerial. However, it may not be necessary to remove the distribution apparatuses 112 from the aircraft 104, 204, 304, depending on where the distribution apparatuses 112 are mounted on the aircraft 104, 204, 304 and the convenience of access. If any distribution apparatuses 112 are removed from the aircraft 104, 204, 304, that occurs prior to block 1404. Flow begins at block 1404.

At block 1404, a cap 412 is removed from a release cylinder 408 of the distribution apparatus 112. In the preferred embodiment, securing straps 424*a* are removed from one or more securing strap mounting points 816. In other embodiments, the cap 412 is unscrewed from the release cylinder 408 or other steps appropriate to the capture method used for the cap 412 are used. Flow proceeds to block 1408.

At block 1408, an operator removes any empty payload containers 124 present in the distribution apparatus 112. Flow proceeds to block 1412.

At block 1412, the operator loads beneficial insects 704 into an open end 708 of a payload container 124. The beneficial insects 704 may be a number of flying insects, eggs, or larvae, and may be in a mixture as described with reference to FIG. 7. Flow proceeds to block 1416.

At block 1416, the operator loads the payload container 124 into an empty slot or cutout 1020*a*, 1020*b* of the internal works assembly 504. It is important that the payload container 124 be loaded so that the open end 708 is blocked by a perpendicular surface in order to prevent the beneficial insects 704 from escaping prior to payload container 124 release. Perpendicular surfaces include the inside surface of the actuator end of the release cylinder 804, the inside surface of the cap 412, or the payload container stop 1028 of an internal works assembly 504*b*. Flow proceeds to decision block 1420.

At decision block 1420, the operator determines if there are more payload containers 124 to load and empty slots or cutouts 1020. If there are more payload containers 124 to load and empty slots or cutouts 1020 remain, then flow proceeds to block 1412 to repeat the loading process for the next payload container 124. If there are not more payload containers 124 to load or empty slots or cutouts 1020 are not available, then the distribution apparatus 112 is considered loaded and flow proceeds to block 1424.

At block 1424, the operator indexes the internal works assembly 504 to a first position, if the internal works assembly 504 is not already in the first position. A first position is where a cutout 1020*a*, 1020*b* is not in alignment with the release cylinder opening 320, 432 of the release cylinder 408. Preferably, a first position corresponds to adjacent cutouts 1020*a*, 1020*b* evenly angularly displaced relative to a longitudinal center line of the release cylinder opening 320, 432. The internal works assembly 504 may be indexed to a first position by either pressing a pushbutton 1212, 1312 or by turning the internal works assembly 504 to a first position prior to re-installing the internal works assembly 504 to the release cylinder 408. Flow proceeds to block 1428.

At block 1428, the operator secures a cap 412 to the release cylinder 408, using any of the methods described with reference to FIG. 4. Flow proceeds to block 1432.

At block 1432, the operator secures the distribution apparatus 112 to the aircraft 104, 204, 304, if it is not already secured. This is repeated for each distribution apparatus 112 on the aircraft 104, 204, 304. Flow ends at block 1432.

Referring now to FIG. 14*b*, a flowchart illustrating a payload container 124 loading process in accordance with a second embodiment of the present invention is shown. Payload containers 124 of the present invention are loaded when the aircraft 104, 204, 304 is on the ground and not aerial. However, it may not be necessary to remove the distribution apparatuses 112 from the aircraft 104, 204, 304, depending on where the distribution apparatuses 112 are mounted on the aircraft 104, 204, 304 and the convenience of access. If any distribution apparatuses 112 or payload containers 124 are removed from the aircraft 104, 204, 304, that occurs prior to block 1440. Flow begins at block 1440.

At block 1440, the operator indexes the internal works assembly 504 to a second position, if the internal works assembly 504 is not already in a second position. A second position is where a cutout 1020*a*, 1020*b* is in alignment with the release cylinder opening 320, 432. Preferably, a second position corresponds to adjacent cutouts 1020*a*, 1020*b* evenly angularly displaced relative to a longitudinal center line of the release cylinder opening 320, 432. The internal works assembly 504 may be indexed to a second position by either pressing a pushbutton 1212, 1312 or by disengaging the actuator 416 from the internal works assembly 504 and turning the internal works assembly 504 to a second position prior to re-engaging the actuator 416 to the internal works assembly 504. Flow proceeds to block 1444.

At block 1444, the operator loads beneficial insects 704 into an open end 708 of a payload container 124. Flow proceeds to block 1448.

At block 1448, the operator installs the loaded payload container 124 through the release cylinder opening 320, 432 into an empty cutout 1020*a*, 1020*b* of the internal works assembly 504. Care must be exercised to make sure the open end of the payload container 708 is flush with an inside end surface of the release cylinder 408 or a payload container stop 1028, in order to prevent the beneficial insects 704 from escaping. Flow proceeds to decision block 1452.

At decision block 1452, the operator determines if there are more payload containers 124 to load and empty slots or cutouts 1020. If there are more payload containers 124 to load and empty slots or cutouts 1020 remain, then flow proceeds to block 1456 to repeat the loading process for the next payload container 124. If there are not more payload containers 124 to load or empty slots or cutouts 1020 are not available, then the distribution apparatus 112 is considered loaded and flow proceeds to block 1460.

At block 1456, the operator indexes the internal works assembly 504 to a next second position. It is preferable to index in a single rotational direction to prevent payload containers 124 from being missed, and for better efficiency. However, the present invention encompasses embodiments whereby the internal works assembly 504 is indexed in both rotational directions, clockwise and counterclockwise, as discussed previously. The internal works assembly 504 is indexed as described with reference to block 1440. Flow proceeds to block 1444.

At block 1460, the operator indexes the internal works assembly 504 to a first position, if the internal works assembly 504 is not already in a first position. A first position is where a cutout 1020*a*, 1020*b* is not in alignment with the release cylinder opening 320, 432 of the release cylinder 408. Preferably, the first position corresponds to adjacent cutouts 1020*a*, 1020*b* evenly angularly displaced relative to a longitudinal center line of the release cylinder opening 320, 432. The internal works assembly 504 may be indexed to a first position by either pressing a pushbutton 1212, 1312 or by disengaging the actuator 416 from the internal works assembly 504 and turning the internal works assembly 504 to a first position prior to re-engaging the actuator 416 to the internal works assembly 504. Flow proceeds to block 1464.

At block 1464, the operator secures the distribution apparatus 112 to the aircraft 104, 204, 304, if it is not already secured. This is repeated for each distribution apparatus 112 on the aircraft 104, 204, 304. Flow ends at block 1464.

Referring now to FIG. 15, a flowchart illustrating a manned aircraft 104, 204 payload container distribution process in accordance with a first embodiment of the present invention is shown. Flow begins at block 1504.

At block 1504, a manned aircraft 104, 204 approaches a target area 116 and aligns with a desired distribution pattern at a desired airspeed and height. For example, the manned aircraft 104, 204 orients along the edge of a target area 116 and centered within a first strip of the target area 116. Flow proceeds to block 1508.

At block 1508, the manned aircraft 104, 204 is at the initial distribution point, and distribution of one or more payload containers 124 is ready to begin. At this point, there are no payload containers 124 in alignment with the release cylinder opening 432, and the internal works assemblies of all attached distribution apparatuses 112 are in the first position. Flow proceeds to block 1512.

At block 1512, the operator manipulates a control 1212, 1312 to send a drop a next payload container command 1228, 1328 to a processor circuit 1204, 1324. Flow proceeds to block 1516.

At block 1516, the processor circuit 1204, 1324 generates an actuator signal 1236, 1344 to an actuator 416 of the distribution apparatus 112. Flow proceeds to block 1520.

At block 1520, the actuator 416 rotates the internal works assembly 504 to position a next payload container 124 in alignment with the release cylinder opening 320, 432; therefore, the actuator 416 rotates the internal works assembly 504 to a next second position. Flow proceeds to block 1524.

At block 1524, the distribution apparatus 112 drops a payload container 124 to the target area 116, releasing beneficial insects 704 to the target area 116. Flow proceeds to decision block 1528.

At decision block 1528, the operator determines if additional payload containers 124 are available, or if another target area 116 requires distribution of beneficial insects 704 to the target area 116. If no additional payload containers 124 are available, or no other target area 116 requires distribution of beneficial insects 704 to the target area 116, then flow ends. If more payload containers 124 are available, and another target area 116 requires distribution of beneficial insects 704 to the target area 116, then flow proceeds to block 1512 to resume payload container 124 distribution. In some embodiments, an operator may select a different distribution apparatus 112 if the current distribution apparatus 112 has no more payload containers 124.

Given the internal works assembly 504*a* where up to five payload containers 124 are loaded, the initial actuator signal 1516 and resulting rotation 1520 would correspond to approximately 36 degrees to transition from the first position to a second position. The next four actuator signals 1516/resulting rotations 1520 would each correspond to approximately 72 degrees to transition from a current second position to a next second position. The final actuator signal 1516 and resulting rotation 1520 would correspond to approximately 324 degrees, in reverse, to transition from the last second position back to the first position.

Given the internal works assembly 504*b* where up to four payload containers 124 are loaded, the initial actuator signal 1516 and resulting rotation 1520 would correspond to approximately 45 degrees to transition from the first position to a second position. The next three actuator signals 1516/ resulting rotations 1520 would each correspond to approximately 90 degrees to transition from a current second position to a next second position. The final actuator signal 1516 and resulting rotation 1520 would correspond to approximately 45 degrees to transition from the last second position back to the first position.

Referring now to FIG. 16, a flowchart illustrating an unmanned aircraft 304 payload container 124 distribution process in accordance with a second embodiment of the present invention is shown. Flow begins at block 1604.

At block 1604, an unmanned aircraft 304 approaches a target area 116 and aligns with a desired distribution pattern at a desired airspeed and height. For example, the unmanned aircraft 304 orients along the edge of a target area 116 and centered within a first strip of the target area 116. Flow proceeds to block 1608.

At block 1608, the unmanned aircraft 304 is at the initial distribution point, and distribution of beneficial insects 704 is ready to begin. Flow proceeds to block 1612.

At block 1612, the operator manipulates a control 1312 to send a drop a next payload container command to a wireless transceiver 1304a of an operator interface 1308. Flow proceeds to block 1616.

At block 1616, the wireless transceiver 1304a transmits a drop next payload container command 1328 to a wireless transceiver 1304b on the unmanned aircraft 304. Flow proceeds to block 1616.

At block 1620, the unmanned aircraft wireless transceiver 1304b transmits the drop next payload container command to a processor circuit 1324. In some embodiments, wireless transceiver 1304b transmits the drop next payload container command through a drone processor 1316. Flow proceeds to block 1624.

At block 1624, the processor circuit 1324 generates an actuator signal 1344 to an actuator 416 of the distribution apparatus 112. Flow proceeds to block 1628.

At block 1628, the actuator 416 rotates the internal works assembly 504 to position a next payload container 124 in alignment with the release cylinder opening 320, 432. Flow proceeds to block 1632.

At block 1632, the distribution apparatus 112 drops a payload container 124 to the target area 116, releasing beneficial insects 704 to the target area 116. Flow proceeds to decision block 1636.

At decision block 1636, the operator determines if additional payload containers 124 are available, or if another target area 116 requires distribution of beneficial insects 704 to the target area 116. If no additional payload containers 124 are available, or no other target area 116 requires distribution of beneficial insects 704 to the target area 116, then flow ends. If more payload containers 124 are available, and another target area 116 requires distribution of beneficial insects 704 to the target area 116, then flow proceeds to block 1612 to resume payload container 124 distribution.

The same actuator signal 1624/internal works assembly rotation 1628 described with respect to internal works assembly 504a, 504b in FIG. 15 applies equally to FIG. 16.

Referring now to FIG. 17, a diagram illustrating actuator signals 1236, 1344 for a four payload container 124 release sequence in accordance with the preferred embodiment of the present invention is shown. In the preferred embodiment, the actuator 416 is a GW125S Sail Servo, which is a multi-turn potentiometer.

The actuator 416 receives a pulse stream as the actuator signal 1236, 1344. The pulse width $t_{pw}$ of the pulse communicates the desired angular position of the actuator 416, which directly corresponds to rotation of the inner works assembly 504 and whether a cutout 1020 is aligned with the release cylinder opening 432 (second position), or not (first position). Actuator 416 also has a minimum pulse spacing, $t_{ps}$, and in the case of the GW125S device is nominally 20 milliseconds.

In the case of the GW125S device, the angular positions through 360 degrees range from $t_{pw}=1$ millisecond to $t_{pw}=2$ milliseconds. It can be easily determined by trial and error how to adjust $t_{pw}$ to optimize each inner works assembly 504 position—from a minimum value (a) representing the first position prior to dropping any payload containers 124 to a maximum value (e) representing the second position corresponding to dropping the fourth and last payload container 124.

It should be noted that different types of actuators 416 behave differently, and the actuator signals 1236, 1344 must be adjusted accordingly to account for the differences. The pulses described for the GW125S device are therefore only exemplary.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus to aerially dispense payload containers from an aircraft, comprising:
   an outer portion, comprising a permanent opening to allow only a single payload container to leave the apparatus when the single payload container is in alignment with the opening;
   an inner portion, configured to rotate within the outer portion, comprising:
      a payload container stop, separate from the payload containers, configured to be permanently retained by the inner portion and move lengthwise along the inner portion in order to conform to a length of the payload containers;
   an actuator, coupled to the inner portion; and
   a processor circuit, wherein the processor circuit commands the actuator to rotate the inner portion to cause the payload container to align with the opening.

2. The apparatus to aerially dispense payload containers of claim 1, wherein the payload containers are constructed from a biodegradable material, wherein the payload containers store beneficial insects comprising at least one of flying insects, eggs, and larvae.

3. The apparatus to aerially dispense payload containers of claim 2, wherein one or more payload containers are loaded into the apparatus when the aircraft is not airborne, wherein when the one or more payload containers are loaded into the apparatus:
   a first end of the one or more payload containers is closed and an opposite second end is open; and
   the second end is closed off by a surface of the apparatus, wherein the beneficial insects are retained within the one or more payload container when the second end is closed off.

4. The apparatus to aerially dispense payload containers of claim 1, wherein the opening faces downward when the aircraft is airborne, wherein gravity causes a payload container to fall from the apparatus.

5. The apparatus to aerially dispense payload containers of claim 1, the inner portion further comprising:

a plurality of cutouts configured to retain payload containers when not in alignment with the opening,
wherein the actuator is a servo, wherein the control circuit controls the servo to rotate the inner portion a predetermined angle such that a next cutout of the plurality of cutouts is in alignment with the opening.

6. The apparatus to aerially dispense payload containers of claim 1, wherein after the payload containers are loaded into the apparatus and before the aircraft is airborne, the inner portion is oriented such that no payload containers are in alignment with the opening.

7. The apparatus to aerially dispense payload containers of claim 1, wherein the aircraft is a remotely-piloted aircraft, wherein a ground based operator wirelessly controls the aircraft and the processor circuit with at least one of a wireless transmitter and a stored program on the aircraft.

8. A method for aerially dispensing payload containers to a target area from an aircraft comprising a distribution apparatus, the method comprising:
sending, by a processor circuit, a command to an actuator to rotate an inner portion of the distribution apparatus to aerially dispense a single payload container from the aircraft;
rotating, by the actuator in response to the command, an inner portion relative to an outer portion of an apparatus to bring a cutout of the inner portion in alignment with a permanent opening in the outer portion, wherein the distribution apparatus comprises the outer portion, the inner portion, and the actuator; and
dispensing, by the distribution apparatus, the payload container to the target area when the payload container is in alignment with the opening,
wherein the inner portion is configured to rotate within the outer portion, wherein the inner portion comprises a payload container stop, separate from the payload containers, configured to be permanently retained by the inner portion and move lengthwise along the inner portion in order to conform to a length of the payload containers and a cutout that captures the payload container between the inner portion and the outer portion when the payload container is not in alignment with the opening.

9. The method for aerially dispensing payload containers of claim 8, wherein the payload containers are constructed from a biodegradable material, wherein the payload containers store beneficial insects comprising at least one of flying insects, eggs, and larvae.

10. The method for aerially dispensing payload containers of claim 9, wherein the method further comprising:
loading, by a human operator, one or more payload containers into the distribution apparatus when the aircraft is not airborne, wherein when loaded into the apparatus:
a first end of the payload containers is closed and an opposite second end is open;
the second end makes contact with a surface of the distribution apparatus; and
wherein the beneficial insects are prevented from leaving the payload container when the second end is in contact with the surface, wherein the inner portion comprises a plurality of cutouts.

11. The method for aerially dispensing payload containers of claim 10, wherein a spring in each cutout of the plurality of cutouts provides ejection force against payload containers, wherein the method further comprising:
ejecting, by the spring, a payload container when the payload container is in alignment with the opening.

12. The method for aerially dispensing payload containers of claim 10, wherein the actuator is a servo, wherein the method further comprising:
controlling, by the processor circuit, the servo to rotate the inner portion a predetermined amount such that a next cutout is in alignment with the opening.

13. The method for aerially dispensing payload containers of claim 8, wherein after the payload containers are loaded into the distribution apparatus and before the aircraft is airborne, the method further comprising:
orienting the inner portion such that no payload containers are in alignment with the opening.

14. The method for aerially dispensing payload containers of claim 8, wherein the aircraft is a remotely-piloted aircraft, wherein after a last payload container is dropped from the aircraft, the method further comprising:
sending, by the processor circuit, a command to the actuator to rotate the inner portion such that no cutouts are in alignment with the opening.

15. A remotely-piloted aircraft for distributing beneficial insects to a target area, comprising a distribution apparatus, the distribution apparatus comprising:
an outer portion, comprising:
a permanent opening to allow a single payload container to leave the apparatus when the single payload container is in alignment with the opening; and
a removable cap;
an inner portion, configured to rotate within the outer portion, comprising:
a plurality of cutouts on the periphery of the inner portion that the payload containers fit within; and
a payload container stop, separate from the payload containers, configured to be permanently retained by the inner portion and move lengthwise along the inner portion in order to conform to a length of the payload containers;
an actuator, statically coupled to the outer portion and movably coupled to the inner portion;
a processor circuit, wherein the processor circuit commands the actuator to rotate the inner portion to cause a cutout to align with the opening;
a wireless receiver, coupled to the processor circuit, to receive commands to control the actuator; and
one or more power sources to provide power to the processor circuit, the actuator, and the wireless receiver;
wherein an operator controls the remotely-piloted aircraft and the processor circuit with at least one of a wireless transmitter and a stored program in the processor circuit, wherein when the wireless receiver receives a command to control the actuator, the processor circuit controls the actuator to rotate the inner portion such that a next cutout is in alignment with the opening, wherein the beneficial insects are distributed to the target area after a payload container falls from the distribution apparatus.

16. The remotely piloted aircraft of claim 15, wherein one or more payload containers are loaded into the distribution apparatus when the aircraft is not airborne, wherein when loaded into the apparatus:
a first end of the payload containers is closed and an opposite second end is open; and
the second end makes contact with a surface of the distribution apparatus,
wherein the beneficial insects are prevented from leaving the payload container when the second end is in contact with the surface.

17. The remotely piloted aircraft of claim 15, wherein the actuator rotates the inner portion from a current position to a next position corresponding to a next cutout of the plurality of cutouts is in alignment with the opening.

18. The remotely piloted aircraft of claim 17, wherein the processor circuit comprises:
   a processor; and
   a memory, coupled to the processor, the memory comprising:
      computer instructions for interpreting commands from the wireless receiver, and in response controlling the actuator,
      wherein the computer instructions store at least a first and a second predetermined time, wherein the first predetermined time corresponds to the amount of time required to rotate the inner portion from a first position to a second position corresponding to a next payload container in alignment with the opening, wherein the second predetermined time corresponds to the amount of time required to rotate the inner portion from a current second position corresponding to a current payload container in alignment with the opening to a next second position corresponding to a next payload container in alignment with the opening.

19. The remotely piloted aircraft of claim 15, wherein the inner portion comprises:
   first and second rotating ends to capture the payload containers, wherein each of the first and second rotating ends has one or more cutouts that capture the payload containers; and
   at least one spar member coupled to the first and second rotating ends and causing the inner portion to rotate as a unit.

20. The remotely piloted aircraft of claim 15, wherein the inner portion comprises:
   a payload container axle, wherein the payload container axle comprises a plurality of cutouts on the periphery for retaining a plurality of payload containers.

* * * * *